(12) United States Patent
Siagian et al.

(10) Patent No.: US 12,436,994 B1
(45) Date of Patent: *Oct. 7, 2025

(54) GENERATING DESCRIPTION PAGES FOR MEDIA ENTITIES

(71) Applicant: Amazon Technologies, Inc., Seattle, WA (US)

(72) Inventors: Christian Garcia Siagian, Los Angeles, CA (US); Vedant Ulhas Shete, Milpitas, CA (US); Timothy William Stephani, Emeryville, CA (US); Jobel Kyle Petallana Vecino, Los Angeles, CA (US); Gordon Zheng, North Hollywood, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/680,925

(22) Filed: May 31, 2024

Related U.S. Application Data

(63) Continuation of application No. 17/690,931, filed on Mar. 9, 2022, now Pat. No. 12,026,199.

(51) Int. Cl.
| | |
|---|---|
| *G06F 16/683* | (2019.01) |
| *G06F 16/34* | (2025.01) |
| *G06F 16/68* | (2019.01) |
| *G06F 40/284* | (2020.01) |
| *G06F 40/295* | (2020.01) |

(52) U.S. Cl.
CPC .......... *G06F 16/685* (2019.01); *G06F 16/345* (2019.01); *G06F 16/686* (2019.01); *G06F 40/284* (2020.01); *G06F 40/295* (2020.01)

(58) Field of Classification Search
CPC .... G06F 16/685; G06F 16/686; G06F 16/345; G06F 40/284; G06F 40/295
See application file for complete search history.

(56) References Cited

U.S. PATENT DOCUMENTS

| | | | |
|---|---|---|---|
| 6,638,317 B2 | 10/2003 | Nakao | |
| 10,573,312 B1 * | 2/2020 | Thomson | ................ G10L 15/22 |
| 11,609,738 B1 | 3/2023 | Imbruce et al. | |

(Continued)

FOREIGN PATENT DOCUMENTS

| | | | | |
|---|---|---|---|---|
| CA | 2744744 A1 * | 1/2012 | ....... | G06F 17/30029 |
| CA | 3052862 A1 * | 2/2020 | .......... | G06F 16/243 |

(Continued)

*Primary Examiner* — Mohammad K Islam
(74) *Attorney, Agent, or Firm* — Athorus, PLLC

(57) ABSTRACT

Pages describing episodes of podcasts or other media entities are constructed by interpreting content of the media entities. A transcript of an episode is determined by one or more natural language understanding techniques and divided into chapters. For each of the chapters, a summary sentence of the chapter and one or more key phrases are determined from the transcript, and participants in the chapter are identified. A summary of the episode is determined from the summary sentences of each of the chapters. A page that describes the episode of the podcast including the summary of the episode, as well as one or more of the key phrases and identities of the participants is generated and provided to prospective listeners to the episode.

20 Claims, 15 Drawing Sheets

(56) References Cited

U.S. PATENT DOCUMENTS

| | | | |
|---|---|---|---|
| 2012/0210203 A1* | 8/2012 | Kandekar | G06F 16/345 715/230 |
| 2015/0195406 A1* | 7/2015 | Dwyer | G10L 15/02 379/265.07 |
| 2018/0061256 A1* | 3/2018 | Elchik | G09B 5/02 |
| 2019/0035431 A1 | 1/2019 | Attorre et al. | |
| 2019/0066663 A1 | 2/2019 | Kotri et al. | |
| 2019/0245972 A1* | 8/2019 | Dwyer | G06F 21/6254 |
| 2021/0342361 A1* | 11/2021 | Radzewsky | G06F 16/23 |
| 2022/0050872 A1 | 2/2022 | Adlersberg et al. | |
| 2023/0179709 A1* | 6/2023 | Dwyer | H04M 3/42221 379/265.03 |
| 2023/0230589 A1* | 7/2023 | Giovanardi | G06F 40/279 704/232 |
| 2023/0280966 A1 | 9/2023 | Imbruce et al. | |
| 2023/0315987 A1* | 10/2023 | Shires | H04N 7/15 704/9 |

FOREIGN PATENT DOCUMENTS

| | | | | | |
|---|---|---|---|---|---|
| CA | 3148554 | A1 | * | 2/2021 | ........... G06F 40/279 |
| CA | 3178823 | A1 | * | 5/2022 | ............ G06F 16/61 |
| CA | 3016169 | C | * | 1/2024 | |
| CN | 103714813 | A | * | 4/2014 | ............ G10L 15/22 |
| CN | 111062221 | A | * | 4/2020 | ............ G10L 15/22 |
| CN | 112699677 | A | * | 4/2021 | ........... G06F 40/211 |
| CN | 111460132 | B | * | 8/2021 | ........... G06F 16/345 |
| CN | 113449513 | A | * | 9/2021 | |
| CN | 114402384 | A | * | 4/2022 | |
| CN | 113051932 | B | * | 11/2023 | ........... G06F 16/355 |
| CN | 117015780 | A | * | 11/2023 | |
| CN | 117195887 | A | * | 12/2023 | |
| CN | 117236324 | A | * | 12/2023 | ............ G06F 40/30 |
| JP | 3597697 | B2 | * | 12/2004 | ....... G06F 17/30719 |
| JP | 4345321 | B2 | * | 10/2009 | ........... G06F 16/345 |
| WO | WO-2020214316 | A1 | * | 10/2020 | ............ G06F 40/30 |

\* cited by examiner

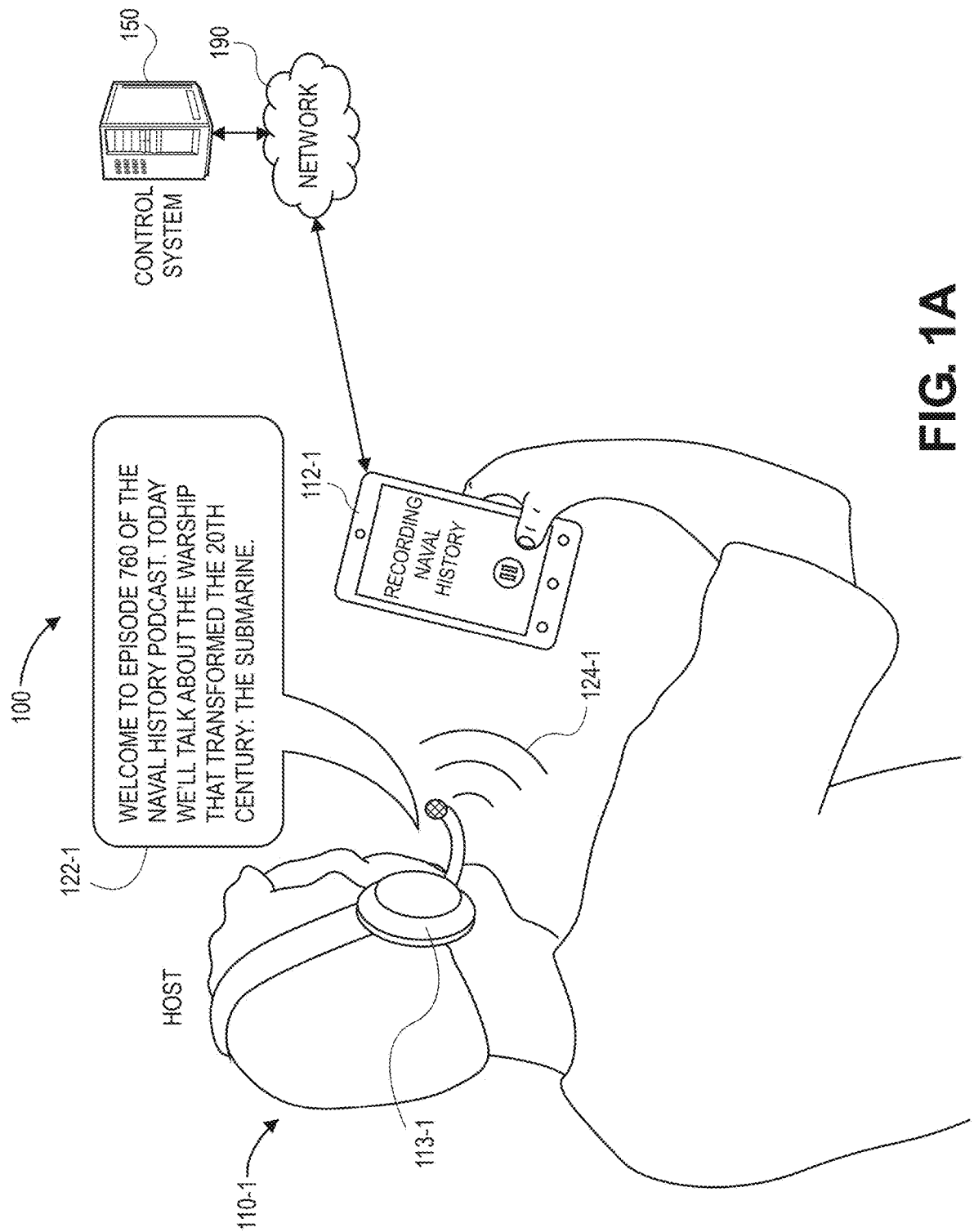

GENERATING DESCRIPTION PAGES FOR MEDIA ENTITIES

BACKGROUND

This application is a continuation of U.S. patent application Ser. No. 17/690,931, now U.S. Pat. No. 12,026,199, filed Mar. 9, 2022, the contents of which are incorporated by reference herein in their entirety.

BACKGROUND

Many users choose to listen to podcasts or other media entities on devices such as mobile devices (e.g., smartphones, tablet computers, wristwatches, or others) or other systems having displays that may be programmed or configured to render information regarding the podcasts or other media entities. For example, where an episode of a podcast is made available to listeners from a streaming service (or a music catalog or repository), the streaming service may provide a page of information or data regarding the episode and the podcast, and cause the page to be displayed in a user interface. The page may include, for example, a title of the podcast, names of one or more creators or hosts of the podcast, a date on which the episode of the podcast was recorded, a duration of the podcast, an image (e.g., "cover art") associated with the podcast, and a summary of the podcast in general or the episode in particular.

Frequently, a listener searching for podcasts or other media entities that are available from a streaming service first learns of a podcast or another media entity by way of one or more of such pages of information or data. For example, a listener who is interested in listening to a podcast from a streaming service may browse through any number of such pages generated for podcasts offered by the streaming service, and read or interpret the information or data displayed thereon when determining whether to listen to a podcast, or when selecting one of the podcasts for listening.

Like any page including information or data, however, a page generated for a podcast is only as valuable as the information or data displayed thereon is accurate and relevant. Therefore, if a page generated for a podcast is not updated frequently, or if the information or data displayed thereon is not germane to a given episode of the podcast, a listener who might otherwise be interested in the podcast in general or the episode of the podcast in particular may be turned off or otherwise decline to listen to the episode. Moreover, pages that are generated for an episode of a podcast typically do not reference specific portions of the episode. Where a page generated for a podcast or an episode thereof is not timely updated with accurate, relevant information or data, creators, hosts or producers of the podcasts potentially lose opportunities to increase listenership, to grow advertising revenues, and to enhance their exposure.

BRIEF DESCRIPTION OF THE DRAWINGS

FIGS. 1A through 1J are views of aspects of one system for generating description pages in accordance with embodiments of the present disclosure.

DETAILED DESCRIPTION

As is set forth in greater detail below, the present disclosure is directed to systems and methods for generating description pages for media entities, such as podcasts. More specifically, in some implementations, when an episode of a podcast or another media entity is recorded, media data (e.g., audio data) representing the episode is transcribed into a set of text by one or more natural language understanding (or "NLU") processes, or any other techniques. The set of text is chapterized, or divided into chapters, with each of the chapters including a subset or portion of the set of text identified in a logical manner. Additionally, a summary sentence is derived for each of the chapters based on a corresponding subset of the set of text, and one or more key words or phrases are identified or selected from the corresponding subset. Participants in each of the chapters, e.g., one or more creators, hosts or guests of a media entity, are also identified. A summary of the podcast is determined from the summary sentences of each of the chapters, and key words or phrases are determined from the key words or phrases of each of the chapters. Additionally, representative participants in the podcast are selected from the participants of the chapters, along with any available information, data or metadata regarding the episode or the podcast.

A page (e.g., an "episode page") representative of an episode of a podcast or another media entity is constructed based on a summary of the episode, key words or phrases of the episode, and identities of the representative participants determined in accordance with one or more of the systems or methods described herein. The page may further include any "cover art," or images representative of the podcast, the episode, or any of the participants, as well as interactive features for causing a playing of the episode, or stopping the playing of the episode, and any other interactive features for interacting with the episode or the podcast, a media service from which the episode may be obtained, or a device on which the episode may be played. The page may be presented to listeners or prospective listeners to the episode or the podcast in any manner, such as individually or together with other pages constructed for other episodes of the same podcast or other podcasts. A listener who may be interested in listening to the episode may evaluate any of the information or data displayed on the page, and initiate a playing of the episode by one or more gestures or other interactions with one or more interactive features included on the page, or in any other manner.

Figure 1B:
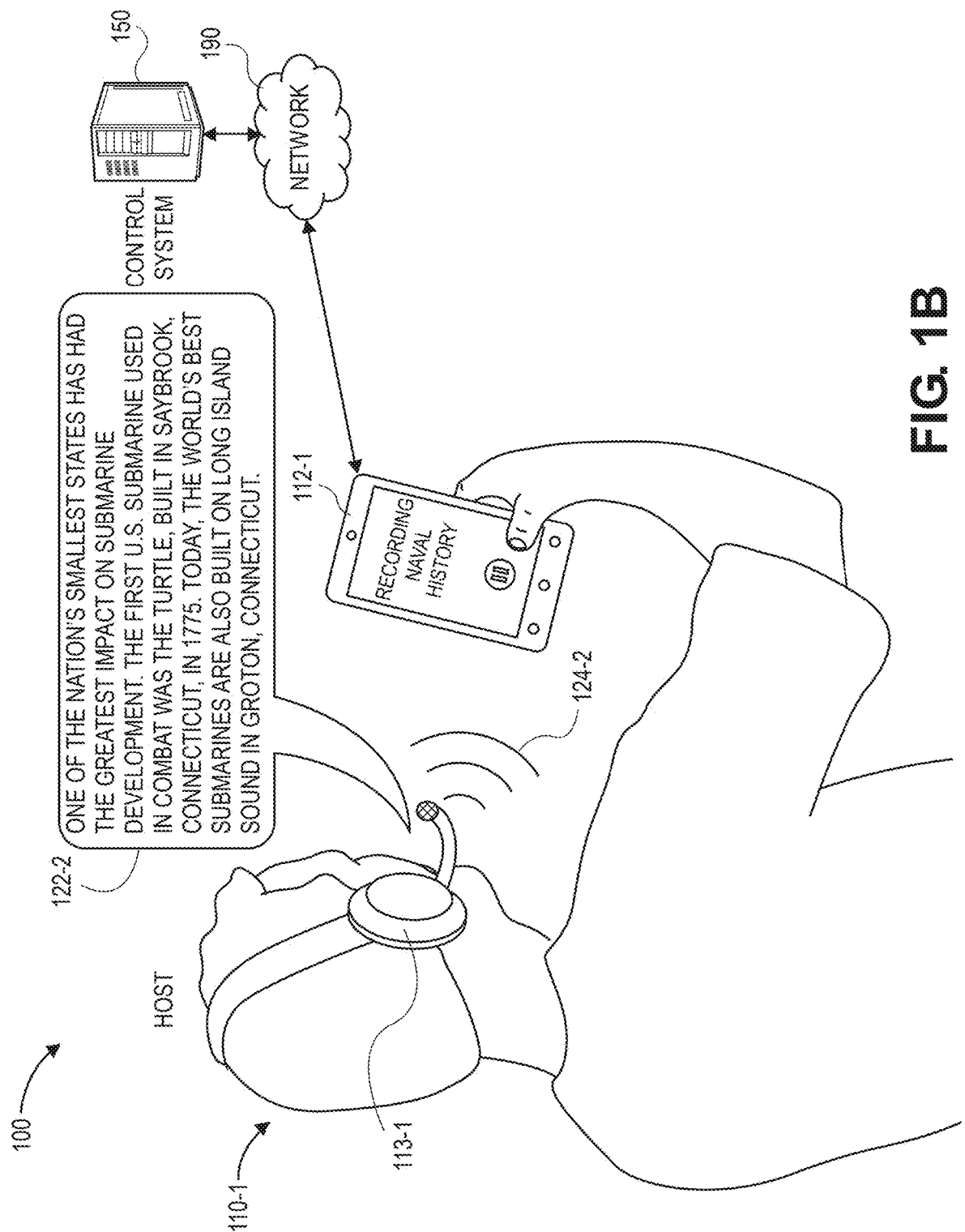

Referring to FIGS. 1A through 1J, views of aspects of one system for generating description pages in accordance with embodiments of the present disclosure are shown. As is shown in FIG. 1A, a system 100 includes a mobile device 112-1 (e.g., a smartphone, a tablet computer, a laptop computer, or any other system or device) of a host 110-1 (e.g., a user, or a host) and a control system 150 (e.g., one or more servers or other computer systems) that are connected to one another or any other devices or systems (not shown) over one or more networks 190, which may include the Internet in whole or in part. The host 110-1 wears a headset 113-1 (or ear buds, ear phones, or head phones) or other communication systems or devices which may be in communication with the mobile device 112-1, and may exchange (e.g., transfer or receive) data relating to audio signals or any other data with the mobile device 112-1. The computer devices that may be operated or utilized in accordance with the present disclosure are not limited by any of the devices or systems shown in FIG. 1A. For example, in some implementations, the host 110-1 may operate any other type or form of computer devices, e.g., automobiles, desktop computers, laptop computers, media player, smart speakers, televisions, wristwatches, or others, together with or instead of the mobile device 112-1, and with or without the headset 113-1.

The mobile device 112-1 may include a display, e.g., a touchscreen such as a capacitive touchscreen, a resistive touchscreen, or any other system for receiving interactions by the host 110-1. Alternatively, or additionally, the host 110-1 may interact with the mobile device 112-1 in any other manner, such as by way of any input/output ("I/O") devices, including but not limited to a mouse, a stylus, a keyboard, a trackball, or a trackpad, as well as any voice-controlled devices or software (e.g., a personal assistant), which may capture and interpret voice commands using one or more microphones or acoustic sensors provided on the mobile device 112-1, the headset 113-1, or any other systems (not shown). In accordance with implementations of the present disclosure, user interfaces rendered on the display may include any number of buttons, text boxes, checkboxes, drop-down menus, list boxes, toggles, pickers, search fields, tags, sliders, icons, carousels, or any other interactive or selectable elements or features that are configured to display information to the host 110-1 or receive interactions from the host 110-1.

As is further shown in FIG. 1A, the host 110-1 records a media entity, viz., an episode of a podcast entitled "Naval History," by making utterances of words that are captured using sensors provided on the headset 113-1 and/or the mobile device 112-1 and transmitted to the control system 150 over the network 190. In particular, the host 110-1 provides an utterance 122-1 to greet listeners and introduce a subject of the media entity, viz., "Welcome to Episode 760 of the Naval History podcast. Today, we'll talk about the warship that transformed the 20th Century: the submarine." The mobile device 112-1 and/or the headset 113-1 may capture audio data 124-1 representing the utterance 122-1 of the host 110-1, and transmit the audio data 124-1 to the control system 150 over the one or more networks 190. The control system 150 may then cause data, e.g., some or all of the audio data 124-1, to be stored thereon or in another location or on another system, and processed as necessary before being transmitted to any devices or systems of one or more listeners upon their request. In some implementations, the control system 150 may cause data, e.g., some or all of the audio data 124-1, to be transmitted directly to devices of one or more listeners, in real time or in near-real time, such as where the media entity is recorded and aired "live."

Additionally, in some implementations, the mobile device 112-1 may include a user interface having one or more features that enable the host 110-1 to exercise control over the media content being transmitted to the control system 150, such as by manipulating a volume or another attribute or parameter (e.g., treble, bass, or others) of audio signals represented in data transmitted to the control system 150, by one or more gestures or other interactions with the mobile device 112-1. Alternatively, or additionally, the user interfaces of the present disclosure may include one or more elements or features for initiating, pausing or stopping the recording of media content to be included in the media entity. The user interfaces may further include any visual cues such as "Recording" or other indicators as to media content that is currently being recorded, as well as one or more clocks, timers or other representations of durations for which media content is being recorded, or times remaining until the recording of media content is expected to end or be terminated.

Media content intended to be included in the media entity may be generated by the host 110-1 or any other participants, captured by their respective systems or devices, and transmitted to the control system 150 for processing, storage and subsequent distribution to one or more listeners. As is shown in FIG. 1B, the host 110-1 provides another utterance 122-2 that is consistent with the subject of the media entity, viz., "One of the nation's smallest states has had the largest impact on submarine development. The first U.S. submarine used in combat was the Turtle, built in Saybrook, Connecticut, in 1775. Today, the world's best submarines are also built on Long Island Sound, in Groton, Connecticut." The mobile device 112-1 and/or the headset 113-1 capture audio data 124-2 representing the utterance 122-2 of the host 110-1, and transmit the audio data 124-2 to the control system 150 over the one or more networks 190.

Figure 1C:
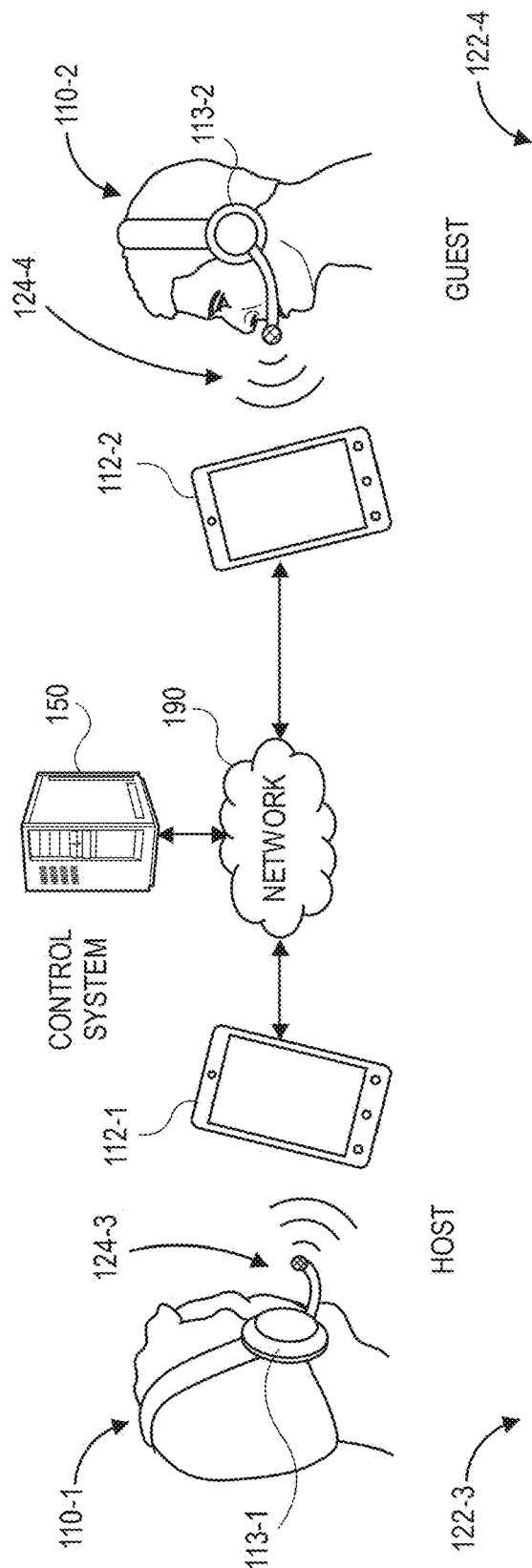

Similarly, as is shown in FIG. 1C, the host 110-1 and a guest 110-2 (or another participant) operating a mobile device 112-2 and wearing a headset 113-2 provide additional sets of utterances 122-3, 122-4 in the form of an interview or another exchange that are captured and transmitted to the control system 150. For example, as is shown in FIG. 1C, the host 110-1 introduces the guest 110-2 and states, "Our guest today is Billy, a builder of submarines. Welcome, Billy," and the guest 110-2 replies, "hey, David, great to chat with you again." The host 110-1 responds by asking, "Tell us how submarines work," and the guest 110-2 replies with, "Well, they have pressure hulls and ballast tanks." The host 110-1 continues by asking, "How do they get their power underwater?" and the guest 110-2 responds, "Smaller ones used diesel engines and batteries." The host 110-1 further continues by asking, "And the bigger ones?" and the guest 110-2 responds, "Big ones are usually nuclear-powered." The host 110-1 then asks, "What about civilian boats?" and the guest 110-2 replies, "Civilian subs, which have scientific missions, use batteries." The mobile device 112-1 and/or the headset 113-1 of the host 110-1, and the mobile device 112-2 and/or the headset 113-2 of the guest 110-2, capture audio data 124-3, 124-4 representing the utterances 122-3, 122-4 of the host 110-1 and the guest 110-2, and transmit the audio data 124-3, 124-4 to the control system over the one or more networks 190.

Figure 1D:
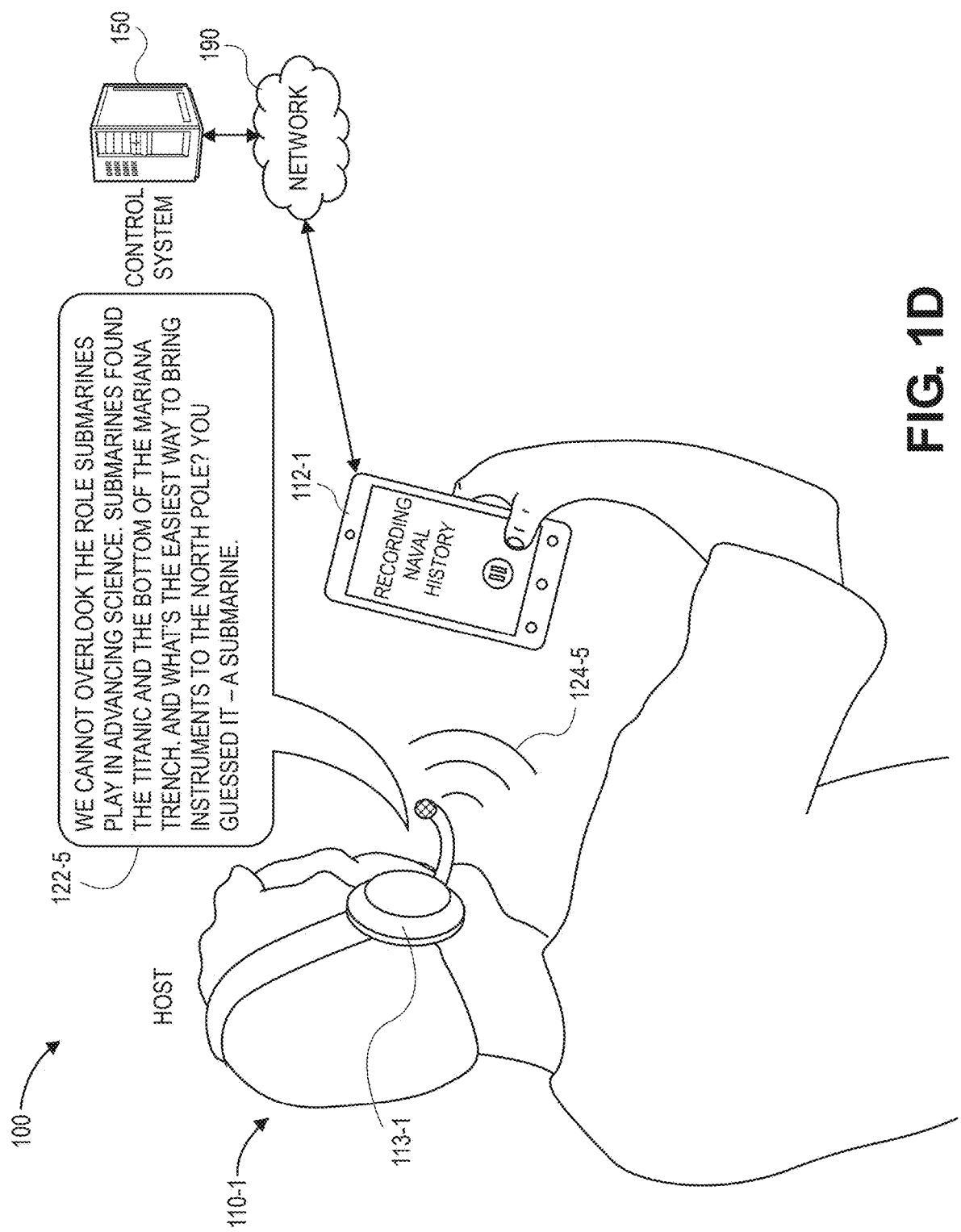

Finally, as is shown in FIG. 1D, the host 110-1 provides another utterance 122-5 that is consistent with the subject of the media entity, viz., "We cannot overlook the role that submarines play in advancing science. Submarines found the Titanic and the bottom of the *Mariana* Trench. And what's the easiest way to bring instruments to the North Pole? You guessed it-a submarine." The mobile device 112-1 and/or the headset 113-1 capture audio data 124-5 representing the utterance 122-5 of the host 110-1, and transmit the audio data 124-5 to the control system 150 over the one or more networks 190.

In accordance with implementations of the present disclosure, a description page for a media entity, such as an episode of a podcast, may be generated by transcribing the media entity into a set of text (e.g., a transcript), chapterizing the set of text into subsets corresponding to chapters of the media entity, and determining summary sentences, key words or phrases, and identities of participants from the respective subsets. A summary of the media entity, along with key words or phrases for the media entity, and participants in the media entity, are determined from the summary sentences, key words or phrases, and identities of participants determined for each of the respective subsets. A description page including the key words or phrases for the media entity, and identities of the participants in the media entity, and optionally any "cover art," or images representative of the media entity, as well as one or more interactive features for causing a playing or a downloading of the media entity, among other functions, may be generated. The description page may be presented to listeners or prospective listeners to the episode or the podcast in any manner, such as individually or together with other pages constructed for other episodes of the same podcast or other podcasts.

Figure 1E:
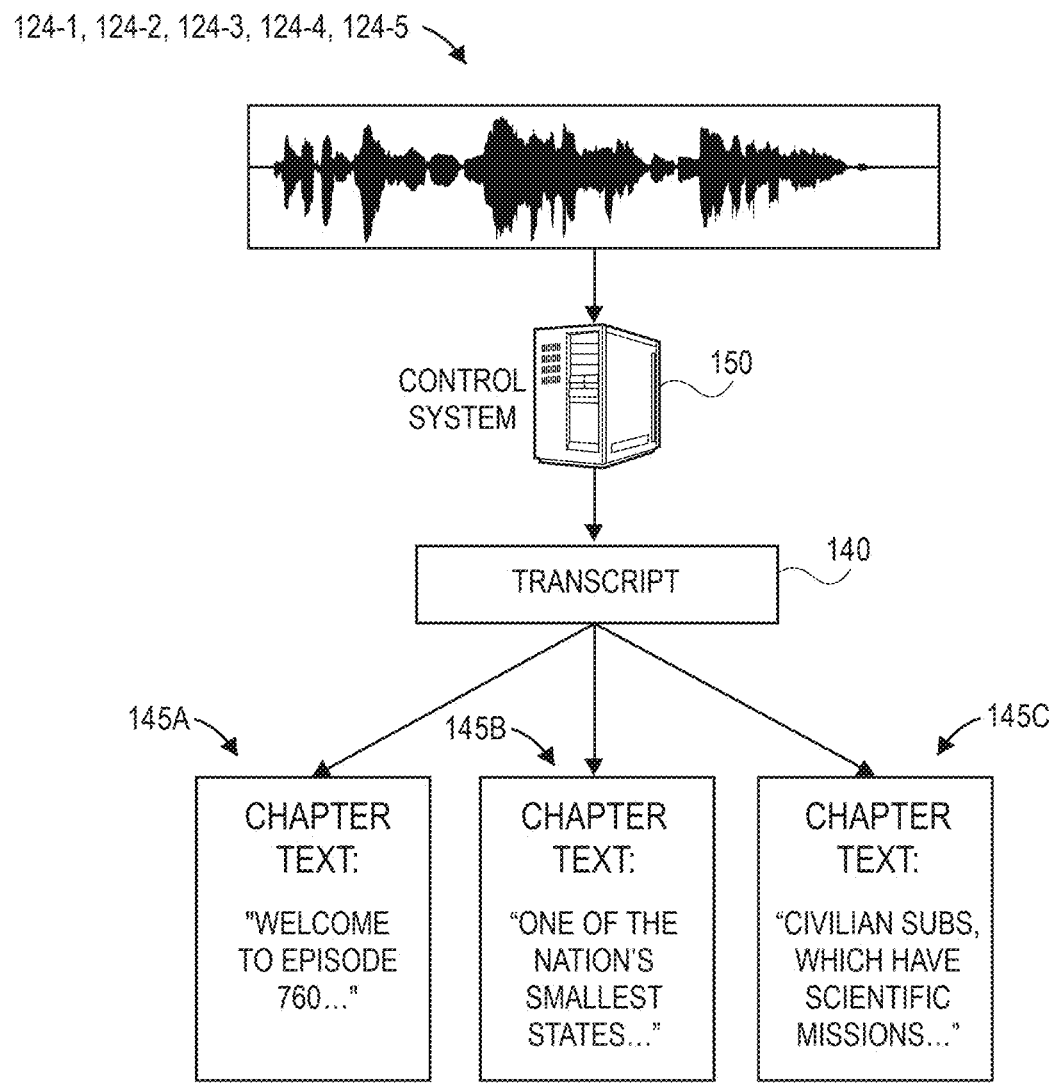

As is shown in FIG. 1E, the audio data 124-1, 124-2, 124-3, 124-4, 124-5 captured as shown in FIGS. 1A through 1D is processed by the control system 150 or another computer device or system (not shown) to generate a transcript 140 (or another set of text) of words expressed in the audio data 124-1, 124-2, 124-3, 124-4, 124-5. The control system 150 may be configured to execute one or more automatic speech recognition applications or functions on the audio data 124-1, 124-2, 124-3, 124-4, 124-5 to generate a word-based output, viz., the transcript 140, therefrom.

The transcript 140 may have any length or number of words, determined on the type, form or duration of the audio data 124-1, 124-2, 124-3, 124-4, 124-5. For example, in some implementations, where the audio data 124-1, 124-2, 124-3, 124-4, 124-5 has a duration of approximately sixty minutes, the transcript 140 may have approximately ten thousand words. Alternatively, the transcript 140 may have any other number of words.

Once the transcript 140 has been generated from the audio data 124-1, 124-2, 124-3, 124-4, 124-5, the transcript 140 may be chapterized, or divided into subsets corresponding to chapters 145A, 145B, 145C, in a logical manner. For example, the transcript 140 may be chapterized by providing the transcript 140 to one or more machine learning models (or algorithms, systems or techniques) that are trained to construct groups of sentences of various lengths or numbers. In some implementations, a transformer may tokenize words included in the transcript 140, and generate word tokens for such words, before generating segment tokens for segments of the transcript 140, which may be portions of uninterrupted, continuous speech by a single participant in the media entity, or portions of the transcript identified in any other manner, such as at random, and defined from the word tokens of each of the segments. The chapters 145A, 145B, 145C may include any number of segments so defined. In some implementations, the transcript 140 may be identified in any other manner and chapterized. The transcript 140 need not have been generated from audio data or a media entity.

In some implementations, the transcript 140 may include changes in topic or subject every three to six minutes, or longer or shorter durations, which may be defined or delineated in any manner, such as by an express identification or statement of one or more participants, or where an advertisement or another break in the audio data is inserted therein. Therefore, where such changes in topic or subject are detected, subsets of text corresponding to the chapters 145A, 145B, 145C may be identified accordingly.

Moreover, in some implementations, after subsets of text are identified from the transcript 140, e.g., by providing the transcript 140 to one or more machine learning models, the subsets may be further processed or otherwise evaluated according to one or more rules to determine whether such subsets constitute a chapter. For example, one rule may relate to a minimum duration of a chapter. Where a subset of text is identified from the transcript 140, the subset of text may not be deemed a chapter if a duration of the subset of text is too brief, e.g., one minute or less. For example, another rule may be content-based, such as to expressly include or exclude segments of the transcript 140 based on their respective content. For example, where a subset of text is identified from the transcript 140 as including or constituting an advertisement, the subset of text may be disregarded or otherwise not included in any chapters defined from the transcript. However, because advertisements are commonly inserted or otherwise included during breaks or at other appropriate times within a media entity, such as a podcast, boundaries separating a subset of text from other portions of a set of text may be relied upon as defining boundaries of a chapter. Any rule relating to size, duration, content or others may be defined and used to determine whether one or more segments of a set of text constitutes a chapter in accordance with implementations of the present disclosure.

Figure 1F:
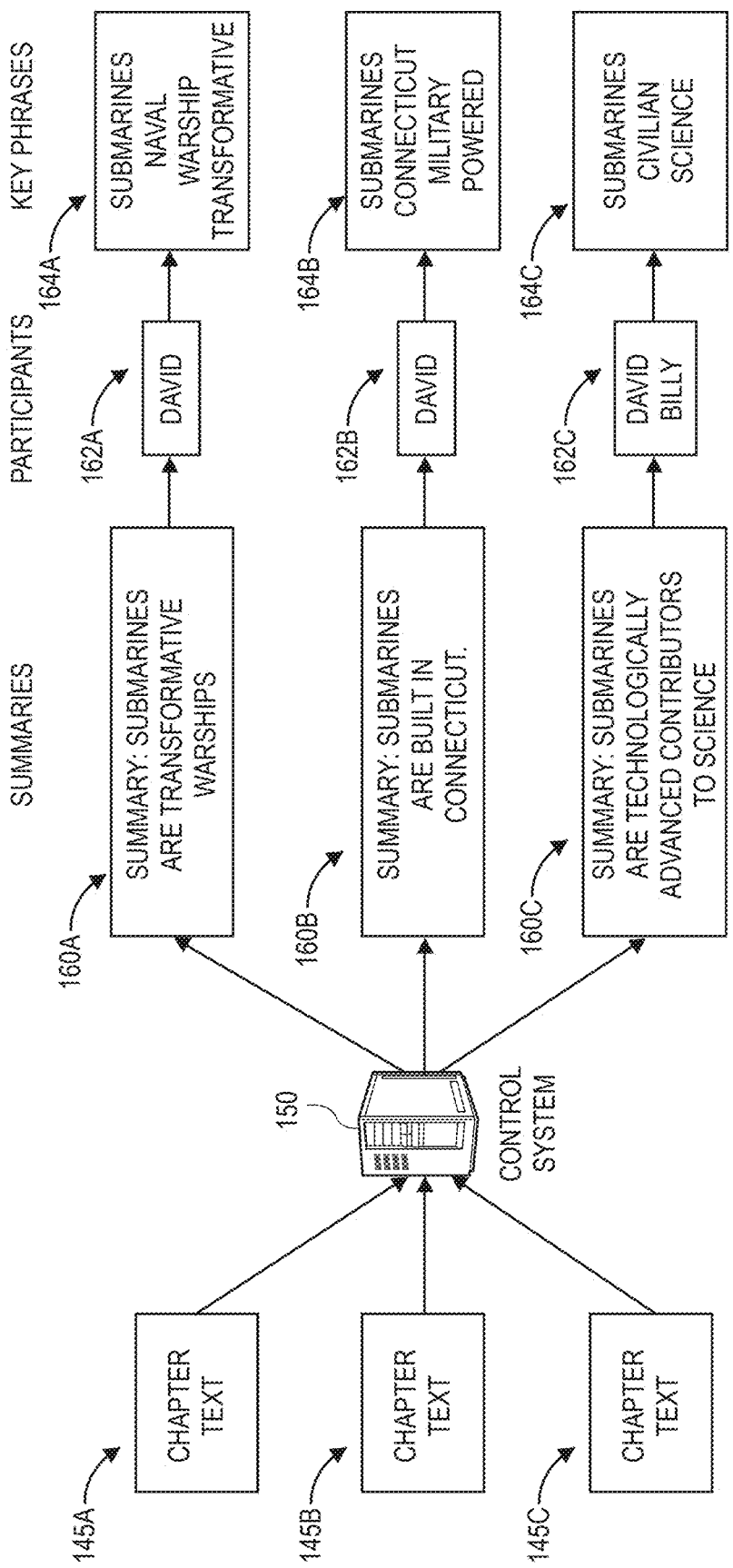

After the chapters 145A, 145B, 145C have been identified from the transcript 140, the chapters 145A, 145B, 145C may be further processed to identify summary sentences, key words or phrases, and identities of participants for such chapters 145A, 145B, 145C. For example, as is shown in FIG. 1F, the control system 150 or another computer device or system (not shown) may identify a summary sentence 160A (viz., "Submarines are transformative warships.") for the chapter 145A, as well as a summary sentence 160B (viz., "Submarines are built in Connecticut") for the chapter 145B and a summary sentence 160C (viz., "Submarines are technologically advanced contributors to science.") for the chapter 145C by independently or collectively providing the chapters 145A, 145B, 145C to a summarizer model or transformer, e.g., an extractive summarizer, or another model. In some implementations, bidirectional encoder representations from transformers (or "BERT"), such as a BERT for extractive summarization (or "BERTSUM") may be utilized. Alternatively, the summary sentences 160A, 160B, 160C may be identified for each of the chapters 145A, 145B, 145C in any other manner and on any basis.

The control system 150 or another computer device or system (not shown) may further identify participants 162A, 162B, 162C in the media entity, viz., the host 110-1 ("David") in the chapter 145A and in the chapter 145B, and the host 110-1 and the guest 110-2 ("Billy") in the chapter 145C in any manner, such as by using one or more machine learning models (or algorithms, systems or techniques). In some implementations, the machine learning models may include a participant detector model, which may include one or more transformers or other models.

The control system 150 or another computer device or system (not shown) may further identify key phrases 164A (viz., "submarines naval warship transformative"), key phrases 164B (viz., "submarines Connecticut military powered"), and key phrases 164C (viz., "submarines civilian science") for each of the chapters 145A, 145B, 145C, which may be important words or phrases identified in the context of the respective chapters 145A, 145B, 145C. Such words or phrases may be identified using one or more machine learning models (or algorithms, systems or techniques), such as a key phrase detector model, which may include one or more transformers or other models. The key phrases 164A, 164B, 164C may be identified with respect to their specific locations within the subsets of the transcript 140 in each of the chapters 145A, 145B, 145C, as well as a number or frequency with which each of such phrases 164A, 164B, 164C appears within such chapters 145A, 145B, 145C, or in any other manner.

In some implementations, the summary sentences 160A, 160B, 160C, the participants 162A, 162B, 162C and the key phrases 164A, 164B, 164C may be identified by a single model, e.g., a single, multi-tasked transformer model having a shared backbone and an extractive summarization model, a participant detector and a key phrase detector as sub-modules. Such a model may be trained to receive a subset of text representing one of the chapters by adjusting weights of the shared backbone and the respective sub-modules during training runs for such sub-modules.

Figure 1G:
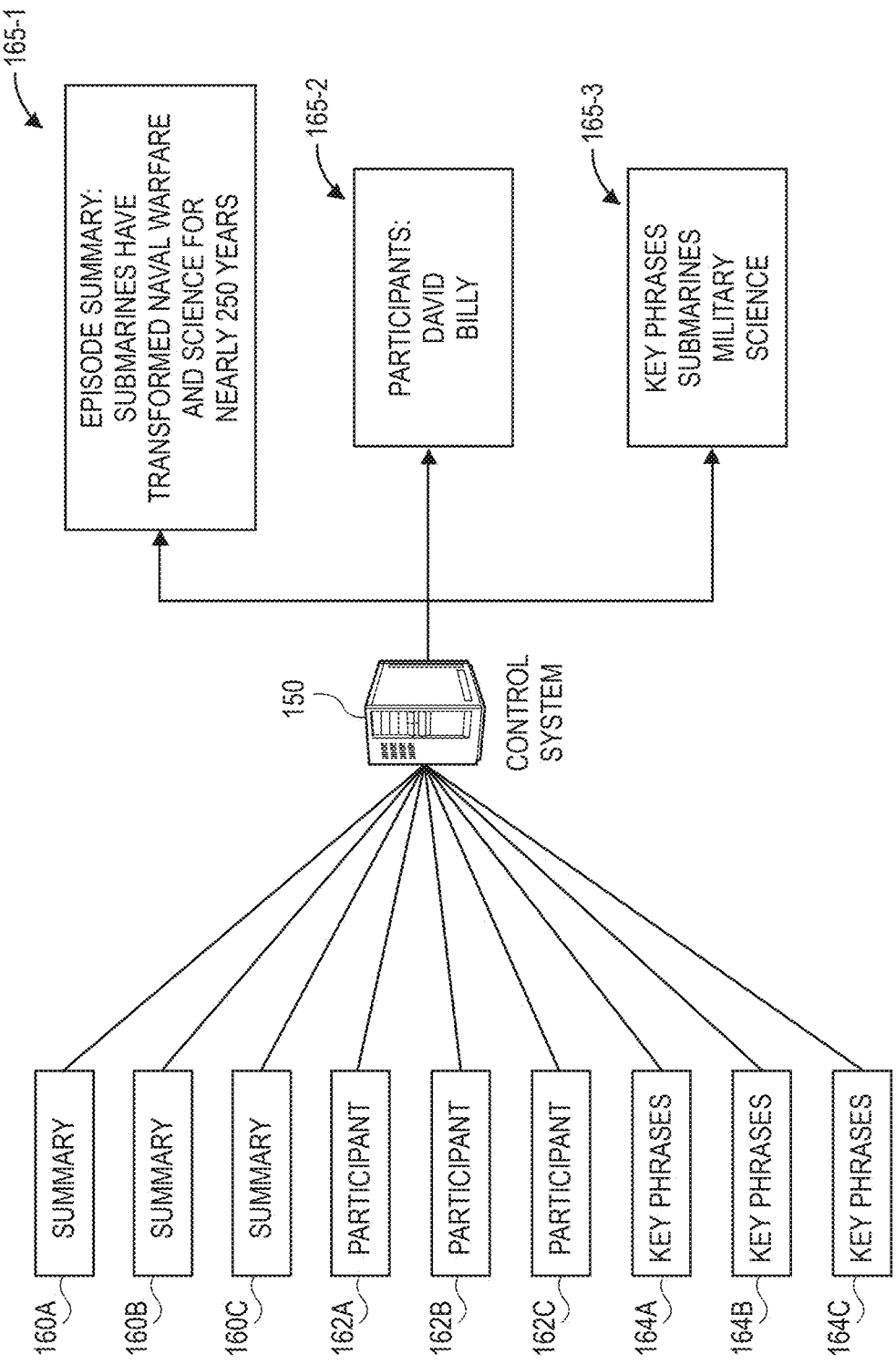

As is shown in FIG. 1G, after the summary sentences 160A, 160B, 160C, the participants 162A, 162B, 162C and the key phrases 164A, 164B, 164C and have been identified for each of the chapters 145A, 145B, 145C of the transcript, the control system 150 or another computer device or system (not shown) may process the summary sentences 160A, 160B, 160C, the participants 162A, 162B, 162C and the key phrases 164A, 164B, 164C to generate a summary 165-1 of the media entity (viz., "Submarines have transformed naval warfare and science for nearly 250 years."), and to identify a set of participants 165-2 in the media entity (viz., "David" and "Billy"), as well as a set of key phrases 165-3 (viz., "submarines military science") of the media entity.

Figure 1H:
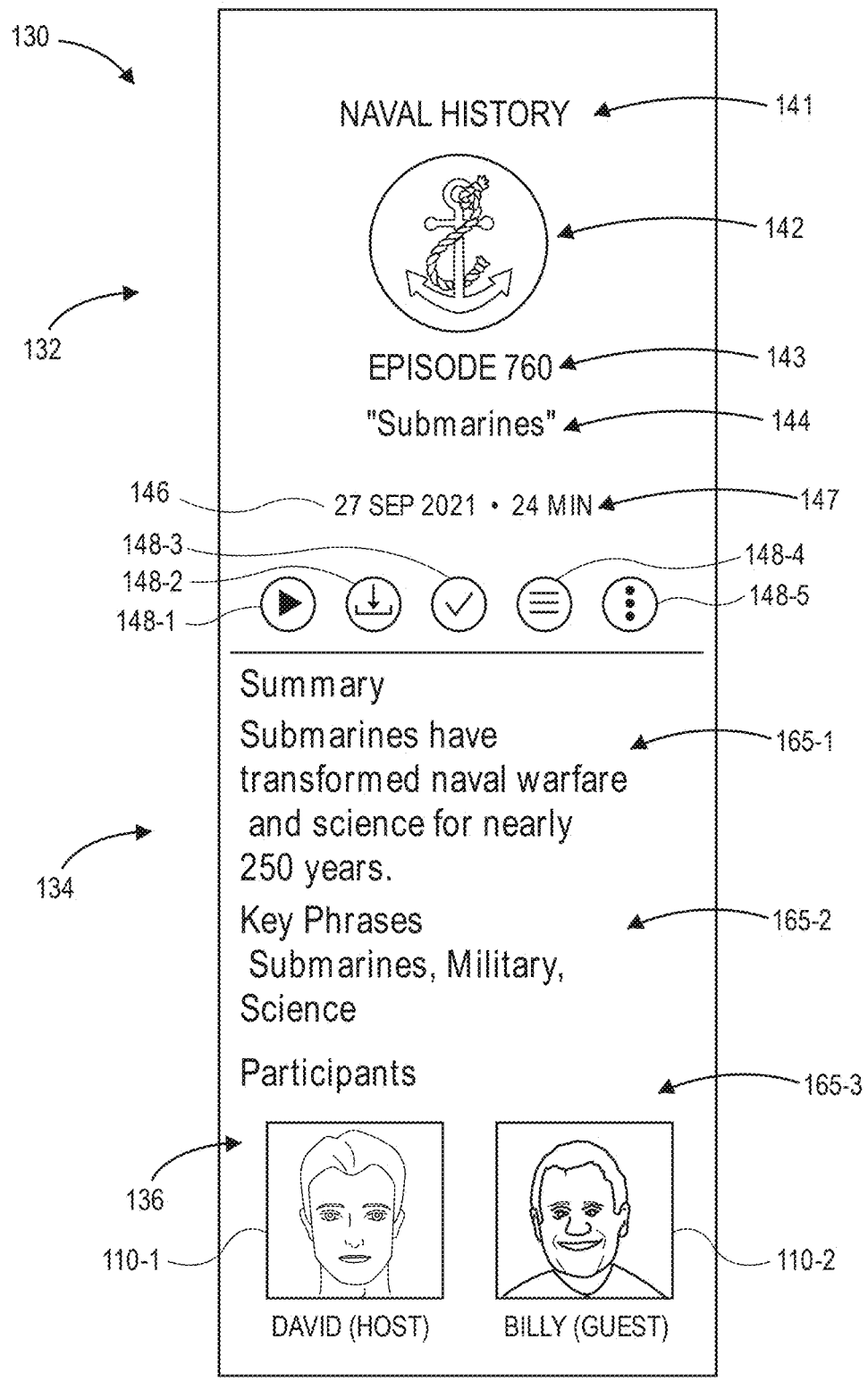

Once a summary of a media entity, key phrases of the media entity and participants in the media entity are identified, one or more pages that are descriptive of the media entity may be generated and presented to listeners or prospective listeners. As is shown in FIG. 1H, a page 130 includes information regarding the media entity generated based on the utterances 122-1, 122-2, 122-3, 122-4, 122-5 of the host 110-1 and the guest 110-2. The page 130 includes an informational section 132, a content section 134 and a participants section 136 in line with one another.

The informational section 132 includes a title 141 of a group of media entities with which the media entity is associated, e.g., a podcast of which the media entity is an episode, as well as an image 142 representative of the media entity in the form of cover art. The informational section 132 further includes an identifier 143 (e.g., a serial number) for the media entity, as well as a title 144 of the media entity. In some implementations, the title 144 may be determined based on one or more of the key phrases 164A, 164B, 164C or the key phrases 165-3 derived therefrom. Alternatively, the title 144 may be identified from any of the text of any of the chapters 145A, 145B, 145C, selected by the host 110-1, or otherwise identified in any other manner. The informational section 132 also includes a date 146 on which the media entity was recorded or first made available to listeners, and a duration 147 of the media entity.

As is also shown in FIG. 1H, the informational section 132 further includes one or more selectable buttons 148-1, 148-2, 148-3, 148-4, 148-5 (or icons or other interactive features) aligned in a horizontal line, or in any orientation. A listener or a prospective listener may select one or more of the buttons 148-1, 148-2, 148-3, 148-4, 148-5 in order to receive or otherwise interact with the media entity, or to obtain additional information regarding the media entity. The button 148-1 may be selected to cause the media entity to be transmitted directly to a device or system on which the page 130 is displayed, e.g., in a streaming manner over the one or more networks 190, to enable a listener to play or listen to the media entity directly in real time or near-real time. The button 148-2 may be selected to cause the media entity to be downloaded and stored on a device or system on which the page 130 is displayed, e.g., for playing or listening to the media entity at a later time, such as when the device or system is not connected to the one or more networks 190, or when connectivity is neither sufficient nor suitable to receive the media content in a streaming manner.

The button 148-3 may be selected to cause a device or a system to subscribe to a group of media entities with which the media entity is associated, e.g., episodes of a podcast, while the button 148-4 may be selected to view information regarding chapters of the media entity, e.g., the chapters 145A, 145B, 145C, or other portions of the media entity. The button 148-5 may be selected to access additional icons or features regarding the media entity.

The content section 134 includes the summary 165-1 and the key phrases 165-2 of the media entity. Additionally, the participants section 136 includes information regarding the participants 165-3, viz., the host 110-1 and the guest 110-2, such as names, images, titles or labels of either of the participants 165-2.

The page 130 may be rendered in a user interface displayed by any type or form of device or system, such as a mobile device (e.g., a smartphone, a tablet computer, a wristwatch, or others), a smart speaker, a laptop computer, a desktop computer, a television, an automobile, a media player, or any other type or form of system having one or more processors, memory or storage components (e.g., databases or other data stores), or other components and a display. The user interface may be associated with a general-purpose application (e.g., a browser) or a dedicated application for playing media entities (e.g., podcasts, or any other type or form of media entity), or any other application.

Figure 1I:
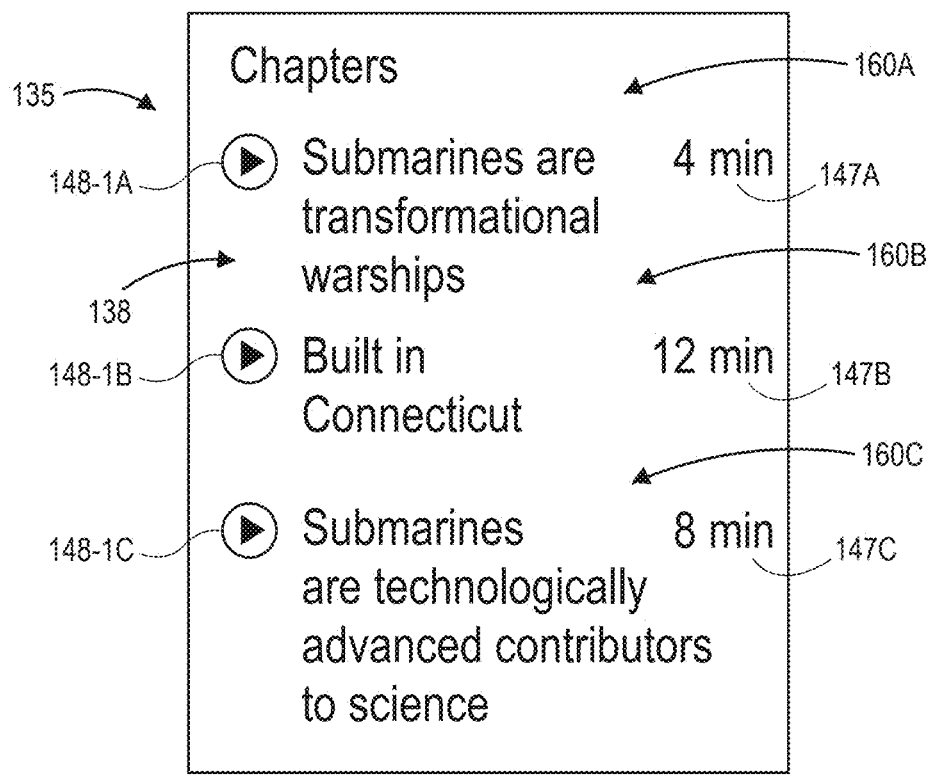

Additionally, as is shown in FIG. 1I, a page 135 includes a chapter section 138 that includes information regarding the individual chapters 145A, 145B, 145C of the media entity. The page 135 includes titles or descriptors of the chapters 145A, 145B, 145C, as well as buttons 148-1A, 148-1B, 148-1C that may be selected to initiate a playing of a portion of the media entity including the respective chapters 145A, 145B, 145C, and durations 147A, 147B, 147C of the chapters 145A, 145B, 145C. Alternatively, or additionally, the titles or descriptors of the chapters may be linked or otherwise configured to initiate a playing of a respective portion of the media entity, and the buttons 148-1A, 148-1B, 148-1C need not be provided.

In some implementations, the page 135 may be displayed in response to a selection of one or more interactive features of the page 130, e.g., the button 148-4. For example, upon a selection of the button 148-4, the page 135 may be displayed as an overlay or window over the page 130, or may replace the page 130 in a user interface. In some other implementations, however, the chapter section 138 may be included in a single page, e.g., in line with the informational section 132, the content section 134, and the participant section 136 in the page 130.

Figure 1J:
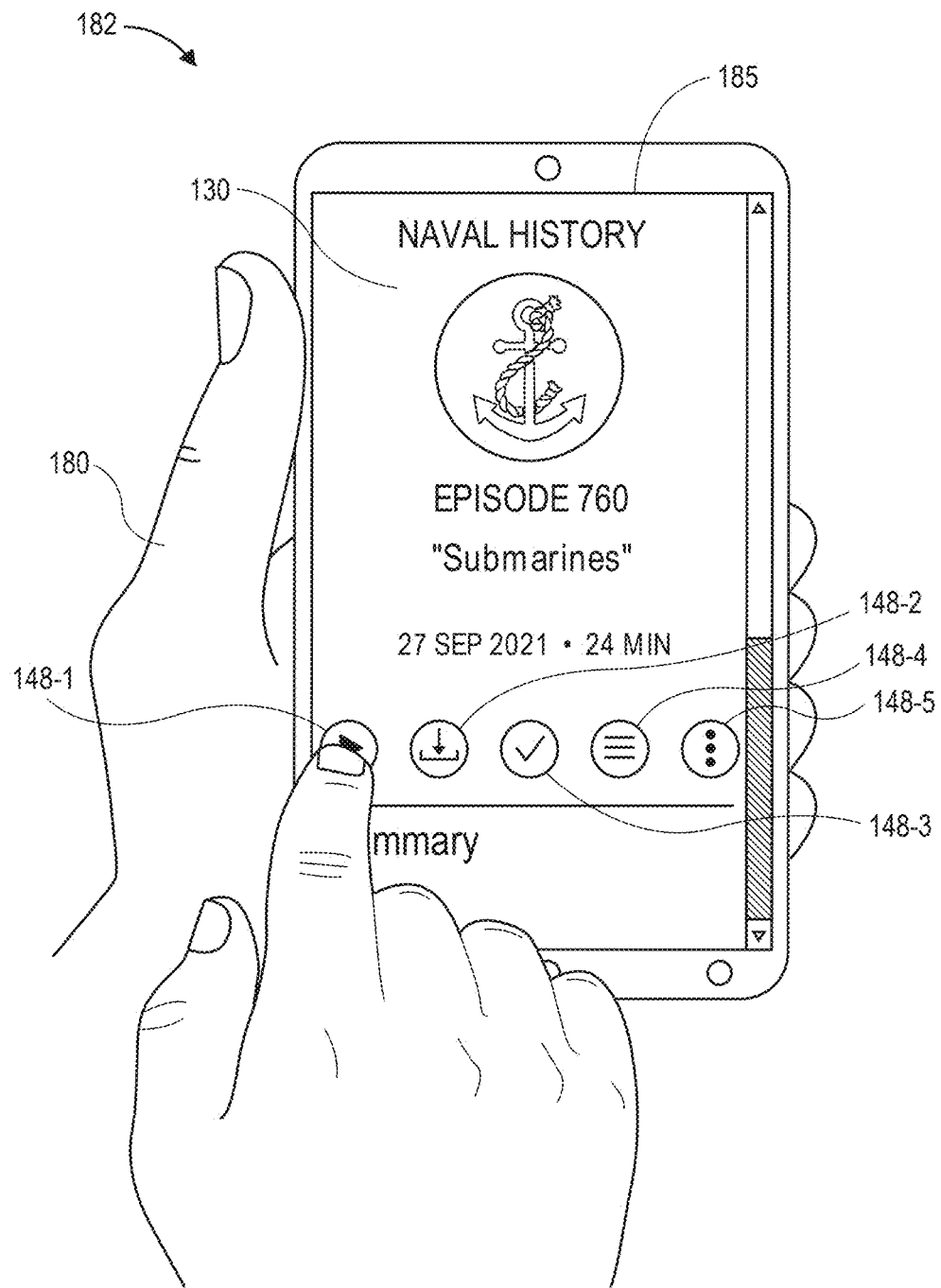

As is shown in FIG. 1J, the page 130 is displayed to a listener 180 on a mobile device 182 having an interactive display 185. A portion of the page 130 shown in the display 185 includes the informational section 132, as well as the buttons 148-1, 148-2, 148-3, 148-4, 148-5. In accordance with implementations of the present disclosure, the listener 180 may cause the media entity to begin streaming to the mobile device 182 by contacting the button 148-1. The media entity may then be transmitted to the mobile device 182 over one or more networks (not shown). The listener 180 may also cause the media entity to be downloaded to the mobile device 182 by contacting the button 148-2. Alternatively, the listener 180 may subscribe to a group of media entities that includes the media entity by contacting the button 148-3, or request to receive additional information regarding the media entity, e.g., the chapter section 138 shown in the page 135 of FIG. 1I, by contacting the button 148-4.

Accordingly, in some implementations, a page including information regarding a media entity, such as a podcast, may be generated based on content of the media entity. For example, the media entity may be transcribed into a set of words or text, e.g., a transcript, which may be divided into any number of chapters. Each of the chapters may be processed to identify a summary sentence or other set of words, as well as to detect key words or phrases within the sets of words, or to identify participants in the media entity. A page including a summary of the media entity derived from the summary sentences of the chapters, and listing some or all of the key words or phrases, or identities of the participants, may be generated for the media accordingly, and presented to listeners or prospective listeners to the media entity.

In some implementations, a set of text may be divided into chapters, or chapterized, using one or more models, such as transformers. For example, a chapterization method or system may include or utilize a transformer that receives audio data of a media entity, e.g., a podcast. The transformer may be any of a variety of transformers, such as an automatic speech recognition ("ASR") engine, a natural language processing ("NLP") engine, or others, that processes the audio data to generate a transcript of words spoken in the audio data. Alternatively, in some implementations, one or more humans may review or edit a transcript generated by a model to identify or correct any errors or mistakes in the transcript.

A chapterization method or system may further utilize a transformer that tokenizes words included in a set of text, such as a transcript, generates word tokens for those words, and generates segment tokens for segments (or portions) of the set of text based on word tokens generated for words included in a respective segment (or portion) of the set of text. The transformer may further determine which segments of a media entity correspond to chapters of the media entity.

In some implementations, a chapterization method or system may also utilize a transformer, e.g., a summarization transformer, that process segments of a chapter, such as an initial segment of a chapter, to generate a summary sentence of the chapter. For example, a subset of a transcript corresponding to a first segment of a chapter may be processed to determine a subject of the chapter, which may then be used to identify a title for the chapter. In some implementations, the summarization transformer may be an extractive summarization transformer or an abstractive summarization transformer.

In some implementations, participants (e.g., creators or hosts as well as any guests) may be identified in a chapter based on the words of the subset of the transcript, such as by one or more speaker diarization techniques, or in any other manner. In some implementations, key words or phrases may be detected within a chapter by counting instances in which words or phrases appear within text of the chapter.

In some implementations, summary sentences of chapters, participants in the chapters, and key words or phrases of the chapters may be determined independently, e.g., by discrete machine learning models, or in any other manner. In some other implementations, however, the summary sentences, the summary sentences, the participants and the key words or phrases may be determined using a single, multi-tasked model having a shared backbone with respective modules for determining each of the summary sentences, the participants and the key words or phrases.

Once the summary sentences, participants and key words or phrases are identified for chapters, summaries, participants and key words or phrases for a media entity (e.g., episode-level) as a whole are determined. For example, in some implementations, a summary of a media entity may be determined by concatenating or otherwise combining the summary sentences determined for each of the chapters of the media entity, and providing the combined summary sentences as an input to a machine learning model, such as an abstractive summarizer, e.g., a text-to-text transformer, or a text-to-text transfer transformer. In some implementations, a summary of the media entity may be determined from an output received in response to the input, and may have any length, such as predetermined number of words or sentences. Key words or phrases for the media entity may be determined by identifying key words or phrases that appear in multiple chapters, or key words or phrases that appear more than a predetermined number of times in any given chapter. In some implementations, participants in the media entity may be identified by a majority-voting method across multiple chapters, and compared to or cross-checked against any available information, data or metadata to determine which of the participants in the chapters is best suited or most representative of the media entity as a whole.

The pages may be generated or constructed in any manner once summaries, participants and key words or phrases for a media entity (e.g., episode-level) are determined. For example, in some implementations, a page may be generated from a template of code or other data, such that the respective summaries, participants and key words or phrases determined for multiple episodes are displayed in the same location on pages constructed for such episodes. Additionally, where pages are generated or constructed for multiple media entities, each of the pages may be made available for display to a listener, e.g., in a rolling or scrolling format, such that the listener may swipe, drag, slide or otherwise move between the respective pages and interpret the information displayed thereon when determining which of the plurality of media entities that the listener should stream or download.

As used herein, the term "media entity" may refer to media content of any type or form (e.g., audio and/or video) that may be recorded, stored, maintained or transmitted in one or more files, such as a podcast, a song (or title), a television show, a movie, or any other audio and/or video programs. The term "media entity" may also refer to a descriptor of media content, e.g., an era, a genre, or a mood, or any other descriptor of one or more audio and/or video programs. The term "media entity" may further include a file including information, data or metadata regarding one or more sets of media content, or a physical or virtual representation of the one or more sets of media content, such as an album, a playlist, a soundtrack, or any other information, data, metadata, or representations. The term "media entity" may also include one or more persons or entities associated with such media content, e.g., an artist, a group, a label, a producer, a service, a station, or any other persons or entities.

Media content that may be included in a media entity includes, but need not be limited to, media content retrieved from a music catalog, repository or streaming service, one or more advertisements of items, goods or services, or one or more news, sports or weather programs, which may be generated live or previously recorded. Media content that may be included in a media entity also includes audio data representing words that are spoken or sung by a host or creator and one or more other participants, such as musicians, celebrities, personalities, athletes, politicians, or artists, or others.

In some implementations, a transcript may be any set of text, regardless of whether the set of text originated from a media entity. For example, where a book or another work of original authorship includes a set of text, that set of text may be chapterized in any manner, such as by tokenizing words included in the set of text and generating word tokens for the words, and generating segment tokens from which chapters or other subsets of the set of text may be identified. A description page may be subsequently generated from the subsets of the set of text. In some implementations, the set of text may then be read aloud and audio data captured during the reading aloud, e.g., an audible book, may be stored in association with a description page derived from the set of text.

Figure 2:
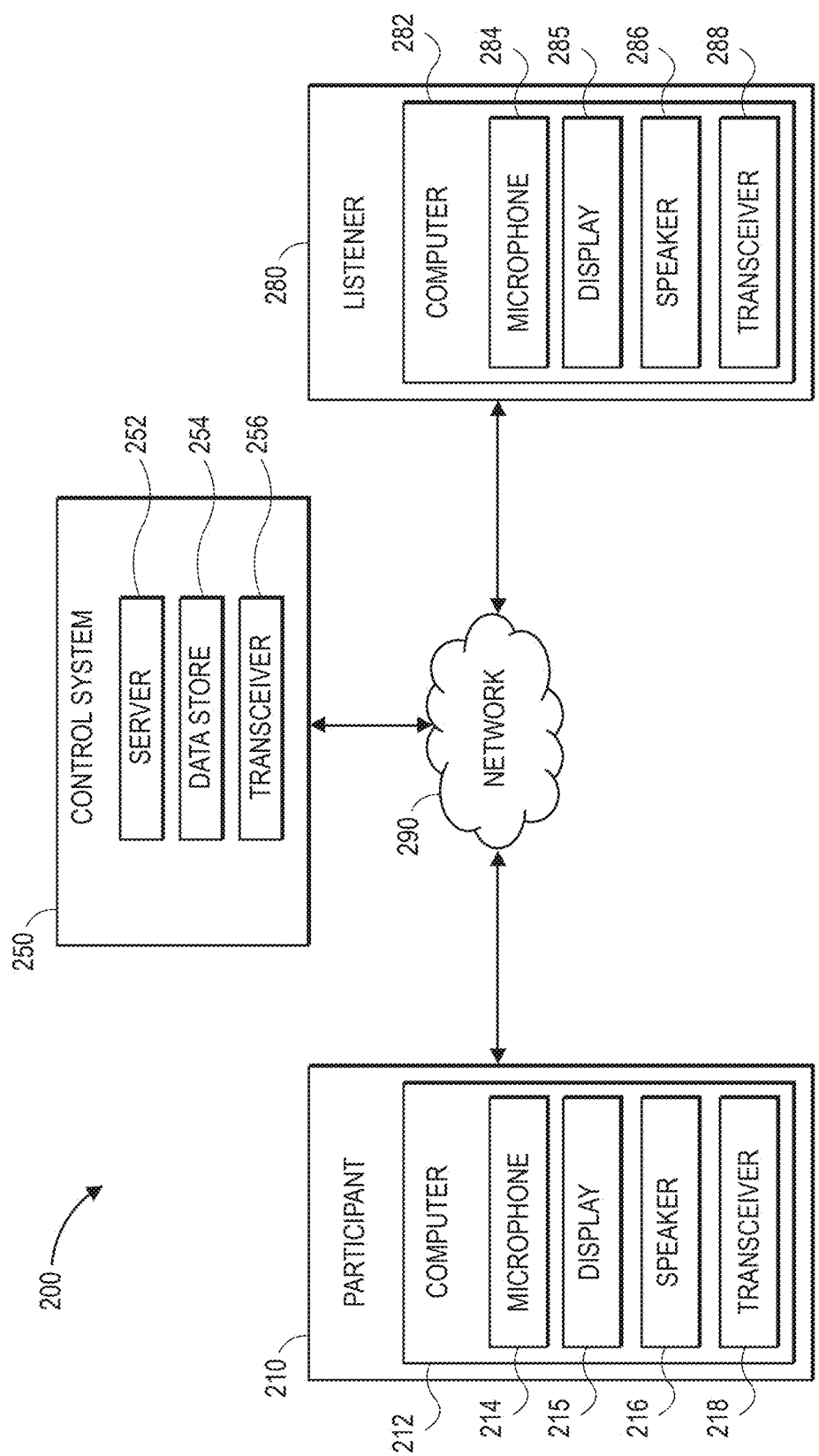
FIG. 2 is a block diagram of components of one system for generating description pages in accordance with embodiments of the present disclosure.

Referring to FIG. 2, a block diagram of components of one system 200 for generating description pages in accordance with embodiments of the present disclosure is shown. Except where otherwise noted, reference numerals preceded by the number "2" shown in FIG. 2 indicate components or features that are similar to components or features having reference numerals preceded by the number "1" shown in FIGS. 1A through 1J.

As is shown in FIG. 2, the system 200 includes a participant 210, a control system 250, and a listener 280 that are connected to one another over one or more networks 290.

The participant 210 may be any individual or entity that generates media content for inclusion in a media entity, such as a podcast. The participant 210 may be a host or a creator associated with the media entity, or a group of media entities. Alternatively, the participant 210 may be a guest of one of the media entities, or any other individual or entity. As is shown in FIG. 2, the participant 210 is associated with or operates a computer system 212 having a microphone 214, a display 215, a speaker 216 and a transceiver 218, and any other components.

In some implementations, the computer system 212 may be a mobile device, such as a smartphone, a tablet computer, a wristwatch, or others. In some other implementations, the computer system 212 may be a laptop computer or a desktop computer, or any other type or form of computer. In still other implementations, the computer system 212 may be, or may be a part of, a smart speaker, a television, an automobile, a media player, or any other type or form of system having one or more processors, memory or storage components (e.g., databases or other data stores), or other components.

The microphone 214 may be any sensor or system for capturing acoustic energy, including but not limited to piezoelectric sensors, vibration sensors, or other transducers for detecting acoustic energy, and for converting the acoustic energy into electrical energy or one or more electrical signals. The display 215 may be a television system, a monitor or any other like machine having a screen for viewing rendered video content, and may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The display 215 may be configured to receive content from any number of sources via one or more wired or wireless connections, e.g., the control system 250 or the listener 280, over the networks 290.

In some implementations, the display 215 may be an interactive touchscreen that may not only display information or data but also receive interactions with the information or data by contact with a viewing surface. For example, the display 215 may be a capacitive touchscreen that operates by detecting bioelectricity from a user, or a resistive touchscreen including a touch-sensitive computer display composed of multiple flexible sheets that are coated with a resistive material and separated by an air gap, such that when a user contacts a surface of a resistive touchscreen, at least two flexible sheets are placed in contact with one another.

The speaker 216 may be any physical components that are configured to convert electrical signals into acoustic energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters.

The transceiver 218 may be configured to enable the computer system 212 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 218 may further include or be in communication with one or more input/output (or "I/O") interfaces, network interfaces and/or input/output devices, and may be configured to allow information or data to be exchanged between one or more of the components of the computer system 212, or to one or more other computer devices or systems (e.g., other aerial vehicles, not shown) via the network 290. The transceiver 218 may perform any necessary protocol, timing or other data transformations in order to convert data signals from a first format suitable for use by one component into a second format suitable for use by another component. In some embodiments, the transceiver 218 may include support for devices attached through various types of peripheral buses, e.g., variants of the Peripheral Component Interconnect (PCI) bus standard or the Universal Serial Bus (USB) standard. In some other embodiments, functions of the transceiver 218 may be split into two or more separate components.

In some implementations, the computer system 212 may include a common frame or housing that accommodates the microphone 214, the display 215, the speaker 216 and/or the transceiver 218. In some implementations, applications or functions or features described as being associated with the computer system 212 may be performed by a single system. In some other implementations, however, such applications, functions or features may be split among multiple systems. For example, an auxiliary system, such as the headset 113-1 of FIG. 1A, may perform one or more of such applications or functions, or include one or more features, of the computer system 212 or other computer systems or devices described herein, and may exchange any information or data that may be associated with such applications, functions or features with the computer system 212, as necessary. Alternatively, or additionally, the computer system 212 may include one or more power supplies, sensors (e.g., visual cameras or depth cameras), feedback devices (e.g., haptic feedback systems), chips, electrodes, clocks, boards, timers or other relevant features (not shown).

In some implementations, the computer system 212 may be programmed or configured to render one or more user interfaces on the display 215 or in any other manner, e.g., by a browser or another application. The computer system 212 may receive one or more gestures or other interactions with such user interfaces, and such gestures or other interactions may be interpreted to generate one or more instructions or commands that may be provided to one or more of the control system 250 or the listener 280. Alternatively, or additionally, the computer system 212 may be configured to present one or more messages or information to the participant 210 in any other manner, e.g., by voice, and to receive one or more instructions or commands from the participant 210, e.g., by voice.

The control system 250 may be any single system, or two or more of such systems, that is configured to control the receipt and transmission of media content from one or more of the participant 210, and to process, store or distribute a media entity including the media content. The control system 250 may operate or include a networked computer infrastructure, including one or more physical computer servers 252 and data stores 254 (e.g., databases) and one or more transceivers 256, that may be associated with the receipt or transmission of media or other information or data over the network 290. The control system 250 may also be provided in connection with one or more physical or virtual services configured to manage or monitor such files, as well as one or more other functions. The servers 252 may be connected to or otherwise communicate with the data stores 254 and may include one or more processors. The data stores 254 may store any type of information or data, including media files or any like files containing multimedia (e.g., audio and/or video content), for any purpose. The servers 252 and/or the data stores 254 may also connect to or otherwise communicate with the networks 290, through the sending and receiving of digital data.

In some implementations, the control system 250 may be independently provided for the exclusive purpose of managing the receipt, storage and distribution of media entities, e.g., by or on behalf of a streaming service or any other source of media content. Alternatively, the control system 250 may be operated in connection with one or more physical or virtual services configured to manage the receipt, storage or distribution of media entities, as well as one or more other functions. Additionally, the control system 250 may include any type or form of systems or components for receiving media content and associated information, data or metadata, e.g., over the networks 290. For example, the control system 250 may receive one or more media files via any wired or wireless means and store such media files in the one or more data stores 254 for subsequent processing, analysis and distribution. In some embodiments, the control system 250 may process and/or analyze media files, such as to add or assign metadata, e.g., one or more tags, to media files.

The control system 250 may further broadcast, air, stream or otherwise distribute media files maintained in the data stores 254 to devices or systems of one or more individuals, such as the listener 280 or the participant 210, over the networks 290. Accordingly, in addition to the server 252, the data stores 254, and the transceivers 256, the control system 250 may also include any number of components associated with the broadcasting, airing, streaming or distribution of media files, including but not limited to transmitters, receivers, antennas, cabling, satellites, or communications systems of any type or form. Processes for broadcasting, airing, streaming and distribution of media files over various networks are well known to those skilled in the art of communications and thus, need not be described in more detail herein.

The listener 280 may be any individual or entity having access to one or more computer devices 282, e.g., general purpose or special purpose devices, who has requested (e.g., subscribed to) media content associated with one or more media entities over the network 290. For example, the computer devices 282 may be at least a portion of an automobile, a desktop computer, a laptop computer, a media player, a smartphone, a smart speaker, a tablet computer, a television, or a wristwatch, or any other like machine that may operate or access one or more software applications, and may be configured to receive media content, and present the media content to the listener 280 by one or more speakers, displays or other feedback devices. The computer device 282 may include a microphone 284, a display 285, a speaker 286, a transceiver 288, or any other components described herein, which may have any of the same respective attributes or features of the computer device 212, the microphone 214, the display 215, the speaker 216 or the transceiver 218 described herein, or one or more different attributes or features. In accordance with the present disclosure, a listener 280 that requests to receive media content associated with one or more media entities may also be referred to as a "subscriber" to such media entities or media content.

Those of ordinary skill in the pertinent arts will recognize that the computer devices 212, 282 may include any number of hardware components or operate any number of software applications for playing media content received from the control system 250 or from any other systems or devices (not shown) connected to the network 290.

Moreover, those of ordinary skill in the pertinent arts will further recognize that, alternatively, in some implementations, the computer device 282 need not be associated with a specific listener 280. For example, the computer device 282 may be provided in a public place, beyond the control of the listener 280, e.g., in a bar, a restaurant, a transit station, a shopping center, or elsewhere, where any individuals may receive one or more media entities.

The networks 290 may be or include any wired network, wireless network, or combination thereof, and may comprise the Internet, intranets, broadcast networks, cellular television networks, cellular telephone networks, satellite networks, or any other networks, for exchanging information or data between and among the computer systems or devices of the participant 210, the control system 250, or the listener 280, or others (not shown). In addition, the network 290 may be or include a personal area network, local area network, wide area network, cable network, satellite network, cellular telephone network, or combination thereof, in whole or in part. The network 290 may also be or include a publicly accessible network of linked networks, possibly operated by various distinct parties, such as the Internet. The network 290 may include one or more wireless networks, such as a Global System for Mobile Communications (GSM) network, a Code Division Multiple Access (CDMA) network, a Long-Term Evolution (LTE) network, a 3G network, a 4G network, a 5G network, or some other type of wireless network. Protocols and components for communicating via the Internet or any of the other aforementioned types of communication networks are well known to those skilled in the art of computer communications and thus, need not be described in more detail herein.

Although the system 200 shown in FIG. 2 shows boxes for one participant 210, one control system 250, one listener 280, and one network 290, those of ordinary skill in the pertinent arts will recognize that any number of participants 210, control systems 250, listeners 280 or networks 290 may be utilized to transmit, receive, access, hear, or view media content provided in accordance with implementations of the present disclosure. Moreover, the computer devices 212, 252, 282 may include all or fewer of the components shown in FIG. 2 or perform all or fewer of the tasks or functions described herein. Tasks or functions described as being executed or performed by a single system or device associated with the participant 210, the control system 250 or the listener 280 may be executed or performed by multiple systems or devices associated with each of the participant 210, the control system 250 or the listener 280. For example, the tasks or functions described herein as being executed or performed by the control system 250 may be performed by a single system, or by separate systems for establishing two-way connections with the participant 210 or any number of media sources, or any other systems, e.g., a mixing system, or for establishing one-way connections with any number of media sources or any number of listeners 280 and transmitting data representing media content, e.g., a broadcast system, from such media sources to such listeners 280. Moreover, two or more participants 210 may collaborate on the construction of a media entity.

In some implementations, one or more of the tasks or functions described as being executed or performed by the control system 250 may be performed by multiple systems.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The computer devices 212, 282 or the servers 252, and any associated components, may use any web-enabled or Internet applications or features, or any other client-server applications or features including E-mail or other messaging techniques, to connect to the networks 290, or to communicate with one another, such as through short or multimedia messaging service (SMS or MMS) text messages. For example, the computer devices 212, 282 or the servers 252 may be configured to transmit information or data in the form of synchronous or asynchronous messages to one another in real time or in near-real time, or in one or more offline processes, via the networks 290. Those of ordinary skill in the pertinent art would recognize that the participant 210, the control system 250 or the listener 280 may include or operate any of a number of computing devices that are capable of communicating over the networks 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as computer devices 212, 282 or the servers 252 or to any other computers or control systems utilized by the participant 210, the control system 250, or the listener 280, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

Figure 3:
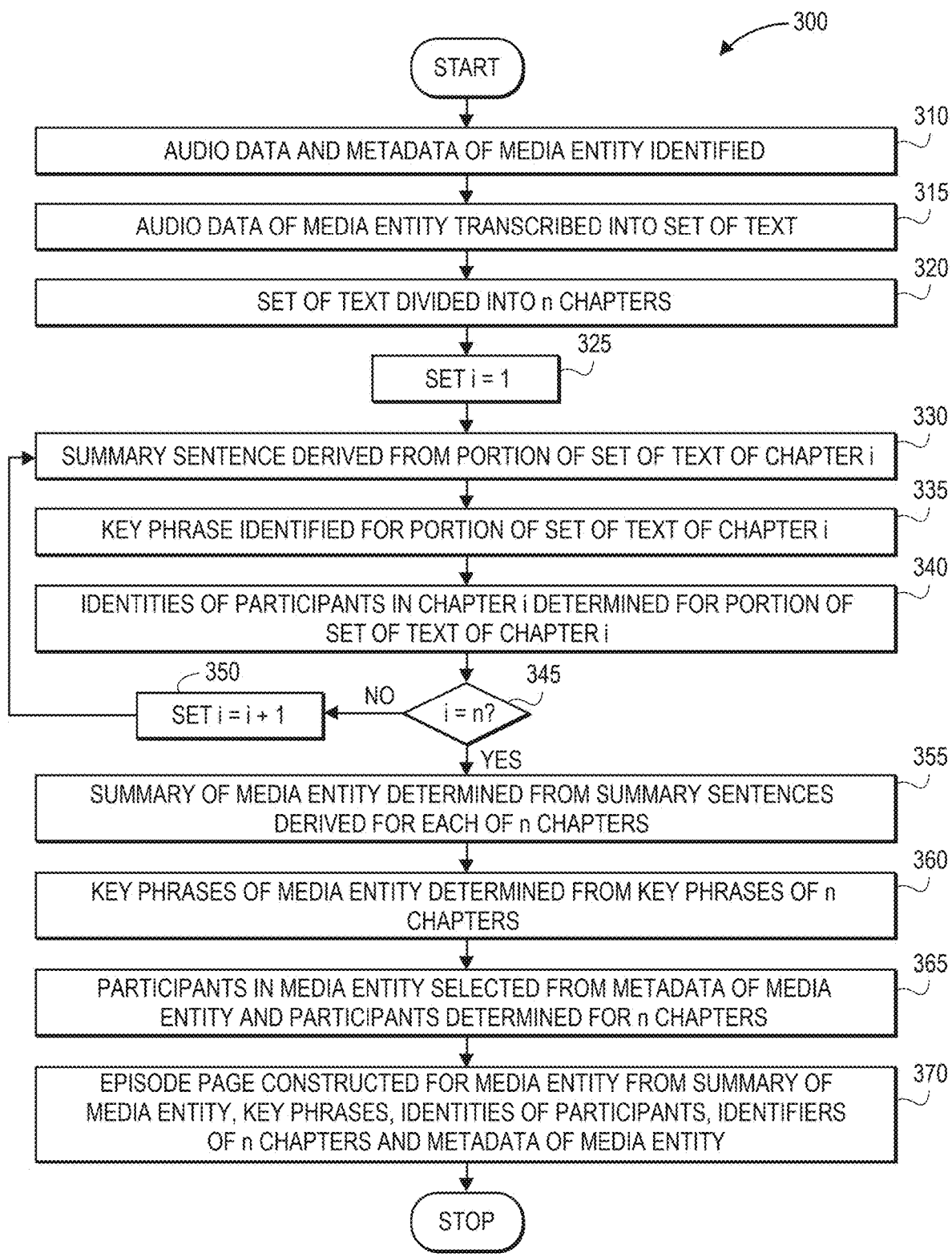
FIG. 3 is a flow chart of one process for generating description pages in accordance with embodiments of the present disclosure.

Referring to FIG. 3, a flow chart 300 of one process for generating description pages in accordance with embodiments of the present disclosure is shown.

At box 310, audio data and metadata of a media entity are identified. In some implementations, the media entity may be a podcast, e.g., a digital media file representing a recorded program of spoken or sung words that is made available to listeners by downloading or streaming to devices over one or more computer networks, which may include the Internet in whole or in part. In some implementations, the media entity may be one of a series of a podcast, e.g., an episode of the podcast, and each episode of the podcast may be associated with a common creator, genre, subject, theme or topic. The audio data or the media entity may be represented in any format, such as one or more Advanced Audio Coding ("AAC"), Audio Interchange File Format ("AIFF"), lossless audio codec, lossless encoder, Moving Picture Experts Group (or "MPEG") Audio Layer III (e.g., "MP3"), Vorbis (e.g., Ogg Vorbis), Waveform Audio File ("WAV"), Windows Media Audio ("WMA"), or other forms or formats, and at any bit rate or level of compression (e.g., 128, 192, 256 or 320 kilobits per second).

The audio data, the metadata or the media entity may be maintained or stored on one or more data stores or other computer devices or systems, which may be provided in one or more alternate or virtual locations, e.g., in a "cloud"-based environment. In some implementations, the audio data, the metadata or the media entity may be maintained or stored on one or more servers or other computer devices or systems associated with a music source (e.g., a catalog, a repository, a streaming service, or another source of media entities). In some other implementations, the audio data, the metadata or the media entity may be maintained or stored on a computer device or system of a creator or host associated with the media entity, or a producer of the media entity.

At box 315, the audio data of the media entity is transcribed into a set of text, e.g., a transcript of the media entity. For example, in some implementations, the audio data may be processed by one or more automatic speech recognition techniques to transcribe the audio data into the set of text. In some implementations, a set of text transcribed from audio data representing approximately one hour of text may include approximately ten thousand words.

For example, the audio data may be processed by an artificial neural network, such as a convolution neural network or a recurrent neural network trained using input features and target labels representing such input features, e.g., training audio data and a transcript of words spoken in the training audio data. The audio data of the media entity may be provided to the artificial neural network as inputs, and the set of text spoken or sung in the audio data of the media entity may be identified based on one or more outputs received from the artificial neural network in response to the inputs.

In some implementations, the audio data of the media entity may be processed prior to providing the audio data to an artificial neural network or another automatic speech recognition technique, such as by resampling the audio data, cropping or trimming the audio data, transforming the audio data, or shifting or otherwise augmenting the audio data. In some implementations, the audio data may be converted to a spectrogram to identify sets of frequencies represented in the audio data, or to a set of data or representation such as a mel-frequency cepstrum, e.g., a set of mel-frequency cepstral coefficients. Any data determined or derived from the audio data may be utilized in transcribing the audio data into the set of text.

In some implementations, a set of text may be identified independent of any media entity, and need not be derived from a media entity, e.g., by transcription. A description page may be derived for the set of text in accordance with one or more implementations disclosed herein, and stored in association with the set of text.

At box 320, the set of text is divided into n chapters. A set of text or transcript of the media entity may be divided into any number of chapters, which may have any length or duration of time and include any number of words. In some implementations, a set of text may be chapterized by tokenizing the set of words, such that a set of word tokens is generated for each word included in the transcript, and segment tokens may be generated for words in a given segment (or portion) of the set of words. Segments corresponding to discrete chapters of the media entity may be identified, e.g., by a transformer or other model, with each of the chapters including one or more of the segments. A section associated with a beginning of a chapter may be identified as such.

In some implementations, a transcript determined from audio data may be processed into a plurality of segments, with each segment representing a contiguous instance of speech of a participant. In some implementations, segments may be generated by processing audio data, e.g., using spectral features, to identify different speakers and segments of the media entity corresponding to the respective speakers.

The segments of the audio data or a transcript thereof may have any size. Large segments, such as those having more than a defined number of words or word tokens, may be further segmented into two or more sub-segments, each of such sub-segments may be treated as an individual segment. Additionally, for each determined segment, word tokens corresponding to words included in the segment may be determined from a transcript thereof. In some implementations, any of a variety of techniques, e.g., Word2vec or another algorithm or technique, may be used to generate an embedding vector of a defined dimension for each word of a segment. Each word token generated for a segment may then be processed together to generate a segment token representative of the entire segment. In some implementations, a segment token may be output on a classification token slot. In some implementations, a segment token may have the same dimensions as each of the word tokens.

Each segment token may then be processed together, and a chapter start probability score indicative of a probability that a chapter begins with a given segment may be determined for each segment. Based at least in part on chapter start probability scores determined for each segment, chapters may be defined for the audio data or a transcript thereof. For example, and for each segment having a chapter start probability score that exceeds a predetermined threshold, the segment may be defined as a start of a new chapter. If the chapter start probability score does not exceed the threshold, however, the segment may be included in a current chapter or a previously established chapter.

A chapter may be defined with respect to a start time corresponding to one segment and a stop time corresponding to another segment. For example, a chapter may be defined as a start time corresponding to a segment and a stop time corresponding to an end of a segment that is just prior to or immediately precedes another segment identified as having a start time for another chapter. All segments between segments that are determined to correspond to chapter starts may be included in a chapter. For example, if a segment 1 is determined to be a start of a first chapter and a segment 6 is determined to be a start of a second chapter, a start timestamp for the first chapter may be a start time of segment 1 and an end timestamp of the first chapter may be specified as a start time of segment 6, which would also mark a beginning of a second chapter. All segments between segment 1 and segment 6, viz., segment 2, segment 3, segment 4, and segment 5, would be included in the first chapter. In some implementations, where a segment represents a pause in speech that is less than a predetermined duration or threshold, the segment representing the pause in speech may be excluded from a chapter. For example, and continuing with the prior example, if segment 5 is only five seconds long and is substantially devoid of speech, segment 5 may be excluded from the first chapter.

In some implementations, in addition to chapter start probability scores, other factors may also be considered in determining which segments correspond to chapters of audio data or a transcript thereof. For example, where information regarding listener interactivity with a media entity is known, a frequency with which other users have started and/or stopped listening to the media entity at particular segments may also be utilized or considered as a factor in determining whether a segment corresponds to a start of a chapter.

Furthermore, in some implementations, where subsets or segments of text are identified from a transcript or any other set of text, e.g., according to one or more machine learning models, the subsets or sets of text may be further processed or evaluated according to one or more rules, prior to determining whether such subsets or segments constitute a chapter. In some implementations, one or more of such rules may relate to a duration of a chapter. For example, in order for one or more segments to be deemed to constitute a chapter, a rule may require that such segments must have at least a minimum length or duration, e.g., thirty seconds. In other implementations, a minimum length or duration of a chapter may be shorter or longer than thirty seconds. If a chapter identified based on one or more segments is less than a minimum length or duration, segments that have been identified or designated as a chapter may be included in another chapter.

In still other examples, a rule may require that a chapter must be less than a maximum length or duration, such as fifteen minutes. In other implementations, the maximum length or duration may be shorter or longer than fifteen minutes. If a chapter is longer than a maximum length or duration, the chapter may be broken up into multiple chapters. For example, segments of a chapter that exceeds the maximum length or duration may be again processed and divided into two or more shorter chapters of less than the maximum length or duration.

Alternatively, or additionally, in some other examples, a rule regarding the generation of a chapter may be based on the content of one or more segments. For example, in some implementations, a rule may expressly include or exclude segments of a transcript in a chapter based on their respective content. For example, where a subset of text is identified from a transcript as including or constituting an advertisement, the subset of text may be disregarded or otherwise not included in any chapters defined from the transcript. However, boundaries separating a subset of text from other portions of a set of text may be relied upon as defining boundaries of a chapter. Any rule relating to size, duration, content or others may be defined and used to divide a set of text into n chapters in accordance with implementations of the present disclosure.

At box 325, a value of a step variable i is set equal to one, or i=1. At box 330, a summary sentence is derived from the portion of the set of text for chapter i. For example, in some implementations, one or more segments of a chapter i of the n chapters into which the set of text is divided at box 320 may be processed to generate a summary sentence of the chapter i. The summary sentence may be identified as a subject of the chapter, or used as a title of the chapter, or the like. In some implementations, each of the segments of the chapter i may be processed to generate the summary sentence. In some other implementations, fewer than all of the segments of the chapter i, such as a single segment, e.g., a first segment, of the chapter i may be processed to generate the summary sentence.

One or more of the segments of the chapter i may be processed in any manner and by any technique in order to generate the summary sentence. In some implementations, one or more of the chapters may be provided to a summarization transformer (e.g., an extractive summarizer) or another model as inputs, and the summary sentence for the chapter may be identified based on an output received in response to the inputs. For example, the extractive summarizer may identify a word that constitutes a beginning of a summary sentence for the chapter i, and a word that constitutes an end of the summary sentence for the chapter i, and the summary sentence may be determined to be or include all of the words between the start and the end.

At box 335, a key phrase is identified for the portion of the set of text for chapter i. The key phrase for the chapter i may be identified in any manner. For example, in some implementations, a detector or a detection model may count each of the words or the word tokens appearing within the chapter i and rank or score each of the words accordingly. One or more of such words, or a phrase including one or more of such words, may be selected based on the number or the frequency with which such words appear within the set of text.

At box 340, identities of participants in the chapter i are determined for the portion of the set of text of chapter i. For example, in some implementations, a detector or a detection model may generate an output representing a likelihood or a probability that each of the words was uttered by a creator, a host of the media entity, or by one or more guests participating in the media entity.

In some implementations, the summary sentence may be derived at box 330, the key phrase may be identified at box 335, and the identities of the participants may be determined at box 340 by a single, multi-tasked transformer model having a shared backbone based on the single portion of text associated with the chapter i. The shared backbone may have three output sub-modules, e.g., an extractive summarization module, a participant detector module and a key phrase detection module. When such a module is trained, weights of the backbone portion may be updated in each training run, while weights of the respective sub-modules may be updated when the corresponding tasks (e.g., summarization, key phrase detection, participant identification) are performed during respective training runs for such modules. In some implementations, however, the summary sentence may be derived at box 330, the key phrase may be identified at box 335, and the identities of the participants may be determined at box 340 by multiple, independently operating models.

At box 345, whether the value of the step variable i is equal to the number of chapters n, or i=n, is determined. If the value of the step variable i is not equal to the number of chapters n, then the process advances to box 350, where the value of the step variable i is incremented by one, set equal to i+1, before returning to box 330.

If the value of the step variable i is equal to the number of chapters n, or i=n, then the process advances to box 355, where a summary of the media entity is determined from the summary sentences determined at box 330 for each of the n chapters. For example, in some implementations, the summary of the media entity may be determined by providing the summary sentences determined for each of the n chapters at box 330 to an abstractive summarizer to construct a summary of the episode, which may include any number of sentences (e.g., three to five) or other sets of words describing the media entity as a whole. Alternatively, the summary of the media entity may be determined in any other manner.

At box 360, key phrases of the media entity are determined from the key phrases identified at box 335 for each of the n chapters. For example, the key phrases of the media entity determined at box 360 may be one or more of the key phrases identified at box 335 that are mentioned in multiple chapters, or one or more of such phrases that are mentioned more than a predetermined number of instances in one of the n chapters. Alternatively, the key phrases of the media entity may be determined in any other manner.

At box 365, one or more participants in the media entity are selected from the metadata of the media entity identified at box 310 and the participants in each of the n chapters determined at box 340. For example, the participants may include a creator or a host of the media entity, or of any of the chapters, as well as any number of guests associated with any of the audio data. In some implementations, creators, hosts or guests of chapters may be selected as participants based on a majority voting process across multiple chapters, and may be compared to or against the metadata of the media entity identified at box 310.

At box 370, an episode page is constructed for the media entity from the summary determined at box 355, the key phrases determined at box 360, identities of the participants selected at box 365, identifiers of the n chapters and the metadata of the media entity, and the process ends.

Figure 4:
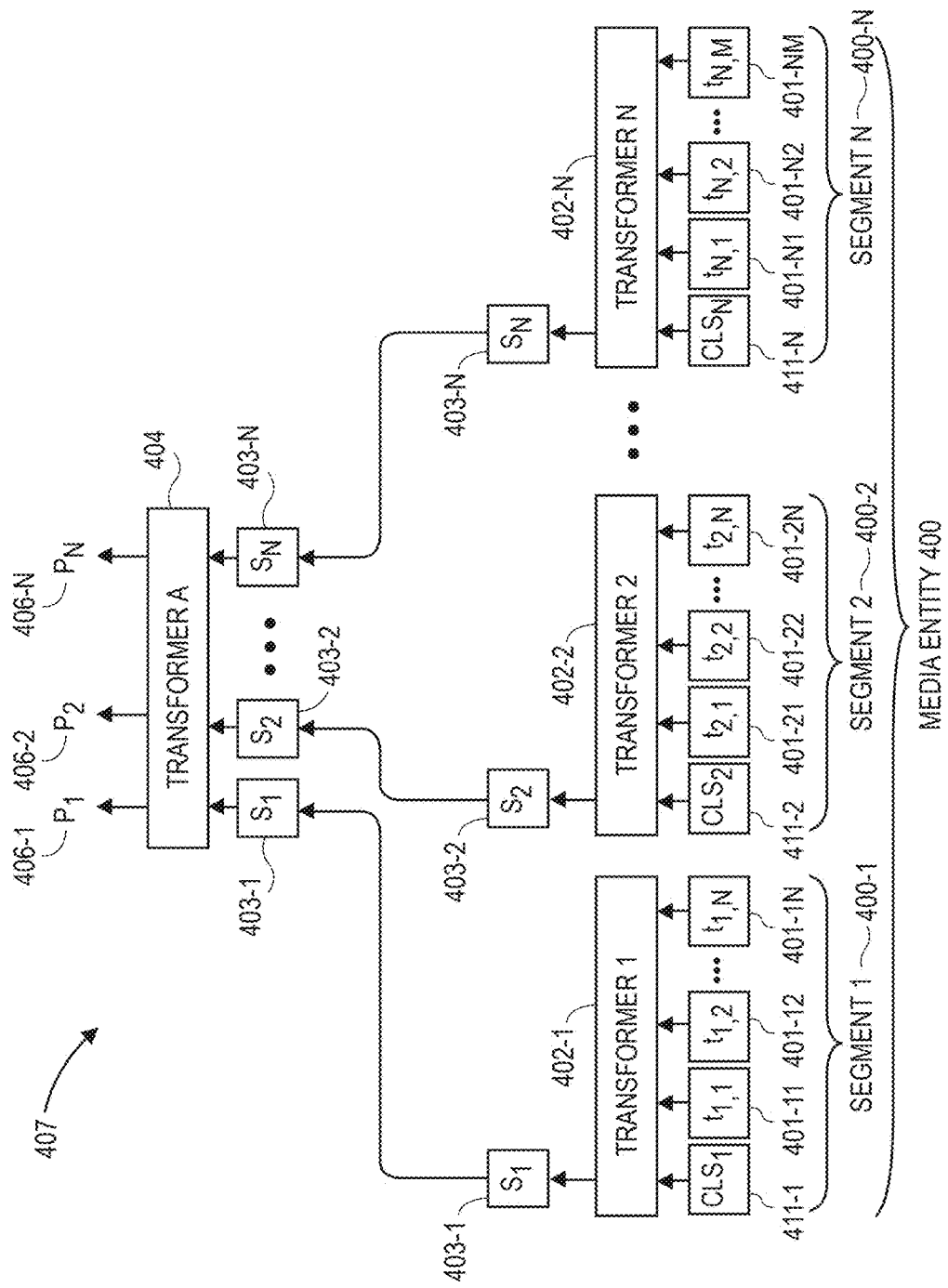
FIG. 4 is a view of aspects of one system for generating description pages in accordance with embodiments of the present disclosure.

Referring to FIG. 4, a view of aspects of one system for generating description pages in accordance with embodiments of the present disclosure is shown.

As is shown in FIG. 4, a chapterization transformer system 407 is shown. The chapterization transformer system 407 includes at least a first layer of transformers 402-1, 402-2 . . . 402-N, or transformer 1, transformer 2, transformer N, and a second layer transformer 404, or transformer A.

A media entity 400 (e.g., an episode of a podcast) may be segmented into a plurality of segments 400-1, 400-2 . . . 400-N, where N is any positive integer. In some implementations, each of the segments 400-1, 400-2 . . . 400-N is an uninterrupted, continuous speech by a single participant in the media entity 400, such as a creator or a host of an episode of a podcast, or a guest participant in the episode. For example, if a host of an episode of a podcast is interviewing a guest, a first segment may include the host asking a question. A second segment may include the guest answering the question. The number N of segments is not limited.

Any of a variety of techniques may be used to segment media content of a media entity between speakers. For example, audio data may be processed to determine spectral features corresponding to voices detected in the audio data, and different sets of spectral features may be used to segment the audio data into different segments. Additionally, segments of audio data may likewise be aligned or synchronized with the transcript generated from the audio data.

In other examples, audio data may be segmented in any other manner. For example, audio data may be segmented into segments having equal sizes (e.g., lengths or durations, or numbers of words), or a predetermined number of segments. In other implementations, audio data may be segmented based on detected pauses in speech, detected changes in tone of speech, or at random.

Word tokens for each word identified in a transcript and corresponding to a segment may be generated for each segment. In some implementations, punctuation may be removed from the transcript, such that word tokens are generated only for words in the transcript. A word token includes an embedding vector representative of the word. For example, a technique such as Word2vec or another algorithm or technique may be used to generate, for each word, an embedding vector of a defined dimension that is representative of that word.

Any number of words may be included in a segment. In some implementations, a maximum size may be specified for each segment. In some implementations, if a number of words included in a segment exceeds a maximum size, the segment may be divided into two or more sub-segments, each of which may be treated as a segment. For example, where a maximum number of word tokens, such as 612, 1,024, or another, may be specified as a maximum size, a segment including more than the maximum number of word tokens may be divided into one or more sub-segments, to improve the efficiency of processing. Sub-segmentation may be particularly useful where a media entity includes only a single speaker.

As is shown in FIG. 4, segment 1 400-1 includes word tokens t1,1 401-11, t1,2 401-12, through t1,N 401-1N, segment 2 400-2 includes word tokens t2,1 401-21, t2,2 401-22, through t2,N 401-2N, and segment N 400-N includes word tokens ty,1 401-N1, tx,2 401-N2, through tN,M 401-NM.

As is also shown in FIG. 4, each segment may include a classification token ("CLS") slot. For example, segment 1 400-1 includes CLS1 411-1, segment 2 400-2 includes CLS2 411-2, and segment N 400-N includes CLSN 411-N. Each of the CLSs may be empty on an input to the transformers 402-1, 402-2 . . . 402-N and may be used as a segment token output from the transformers 402-1, 402-2 . . . 402-N, as discussed below.

Each of the first layer of transformers 402-1, 402-2 . . . 402-N, viz., transformer 1, transformer 2 through transformer N, receives each of the word tokens and the CLS for a corresponding one of the segments 400-1, 400-2 . . . 400-N, and generates a segment token, which may utilize the CLS, representative of the one of the segments 400-1, 400-2 . . . 400-N. Each of the first layer of transformers 402-1, 402-2 . . . 402-N may be pre-trained transformers, e.g., BERT, that generate segment tokens from a plurality of word tokens. A segment token may be of a same dimension as the word tokens. A segment token may be formed based on a combination of the word tokens and CLS for a given segment, and may utilize the CLS when output by the transformer.

As is shown in FIG. 4, transformer 1 402-1 receives CLS1 411-1 and word tokens 401-11 through 401-1N corresponding to segment 1 400-1 of the media entity 400 and produces a segment token S1 403-1 representative of segment 1 400-1, based at least in part on the word tokens 401-11 through 401-1N. Transformer 2 402-2 receives CLS2 411-2 and word tokens 401-21 through 401-2N corresponding to segment 2 400-2 of the media entity 400 and produces a segment token S2 403-2 representative of segment 2 400-2, based at least in part on the word tokens 401-21 through 401-2N. Transformer N 402-N receives CLSN 411-N and word tokens 401-N1 through 401-NM corresponding to segment N 400-N of the media entity 400 and produces a segment token SN 403-N representative of segment N 400-N based at least in part on the word tokens 401-N1 through 401-NM.

Each of the segment tokens 403-1, 403-2 . . . 403-N, or S1, S2 . . . . SN, generated from each of the first layer transformers 402-1 through 402-N may then be provided to the second layer transformer 404, or transformer A. The second layer transformer 404 determines, for each of the segment tokens 403-1, 403-2 . . . 403-N of the media entity 400, a chapter start probability score indicative of a likelihood that one of the segments corresponds to a start of a chapter of the media entity 400.

In some implementations, the second layer transformer 404 may be a deep neural network ("DNN") that is trained to determine chapters based on, for example, pause durations between segments, changes in tone of speakers between segments, entireties of the segments, key words or phrases represented in the segments, or any other factors. In some implementations, the second layer transformer 404 may be trained using labeled data in the form of segments of a media entity that identify segments as a beginning of a chapter, or not a beginning of a chapter. Once the second layer transformer 404 has been trained, the second layer transformer 404 may process segments 400-1, 400-2 . . . 400-N or segment tokens 403-1, 403-2 . . . 403-N generated for audio data, such as the media entity 400, and generate, for each of the segments 400-1, 400-2 . . . 400-N a chapter start probability score indicative of a probability that a segment represents a start of a chapter.

Figure 5:
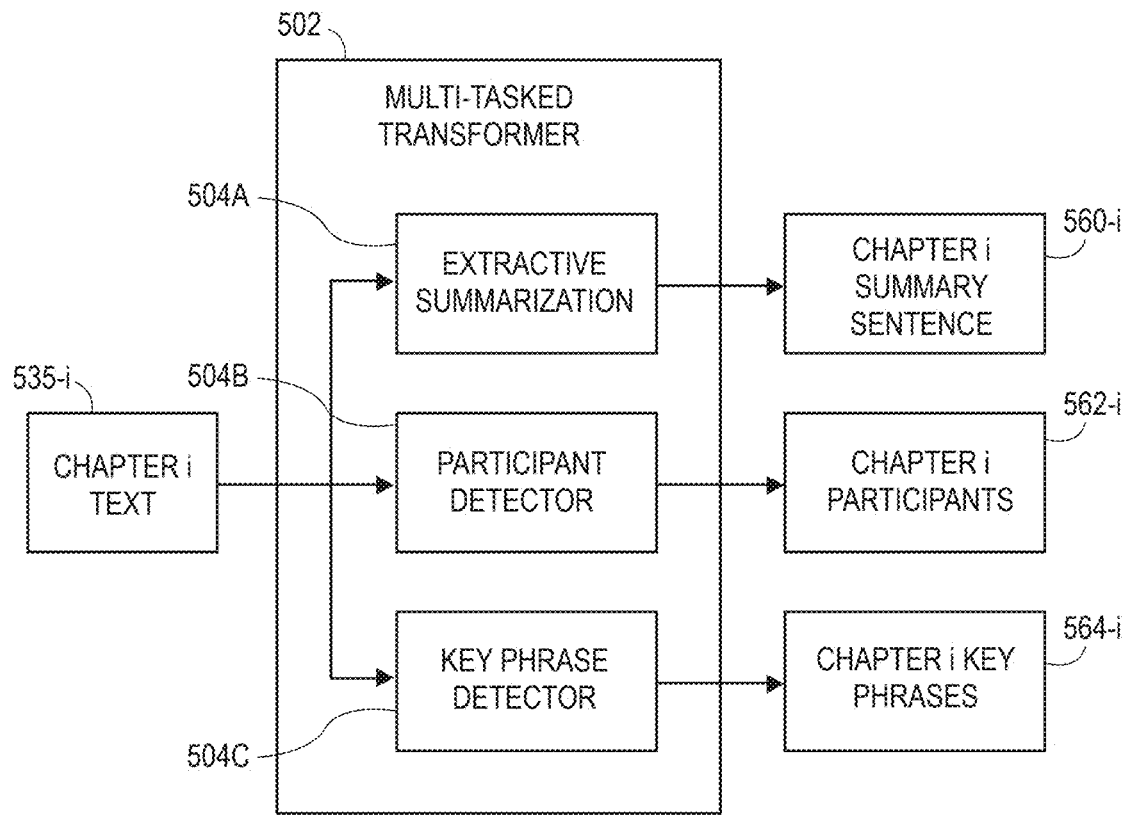
FIG. 5 is a view of aspects of one system for generating description pages in accordance with embodiments of the present disclosure.

As is shown in FIG. 5, text of a chapter i, viz., chapter text 535-$i$, may be processed using a multi-tasked transformer 502 to identify a summary sentence 560-$i$ for the chapter text 535-$i$, participants 562-$i$ in the chapter text 535-$i$, or key phrases 564-$i$ of the chapter text 535-$i$. The multi-tasked transformer 502 may include an extractive summarization module (or sub-module) 504A, a participant detector module (or sub-module) 504B and a key phrase detector module (or sub-module) 504C.

The extractive summarization module 504A may consider the chapter text 535-$i$ in its entirety and identify a start and an end of a summary sentence 560-$i$ (or a summary statement) including words between the start and the end of the summary sentence 560-$i$. For example, the extractive summarization module 504A may be a summarizer model or transformer, e.g., an extractive summarizer, or another model. In some implementations, the extractive summarization module 504A may be a BERT, such as a BERT for extractive summarization. Alternatively, the extractive summarization module 504A may identify summary sentences for chapters in any other manner and on any basis.

The participant detector module 504B may receive the chapter text 535-$i$ in its entirety and generate an output (e.g., a score) indicating a probability or a likelihood that each of the respective words in the chapter text 535-$i$ is associated with one of a plurality of participants 562-$i$, e.g., one or more hosts and any number of guests. In some implementations, adjacent words having a highest probability or likelihood that they are associated with a given participant are grouped together, and groups having the highest numbers of words may be deemed associated with a given participant.

Similarly, the key phrase detector module 504C may receive the chapter text 535-$i$ in its entirety and generate an output (e.g., a score) indicating a level of importance of a given word in the chapter text 535-$i$ to the chapter as a whole. In some implementations, a key phrase 564-$i$ of the chapter text 535-$i$ may be located in a first sentence, or the summary sentence 560-$i$, of the chapter text 535-$i$. In some implementations, the key phrase 564-$i$ is identified by counting words or phrases that appear within the chapter text 535-$i$, and identifying words that appear within the chapter text 535-$i$ more than a predetermined number of times (e.g., three).

The multi-tasked transformer 502 may have a shared backbone and a set of output modules, viz., the extractive summarization module 504A, the participant detector module 504B and the key phrase detector module 504C, for each of a set of tasks. The multi-tasked transformer 502 may be trained to receive a subset of text representing a chapter, and identify the summary sentence 560-$i$, the participants 562-$i$, or the key phrases 564-$i$, by adjusting weights of the shared backbone for each of the training runs, and by adjusting weights of the respective sub-modules during training runs for such sub-modules.

Figure 6:
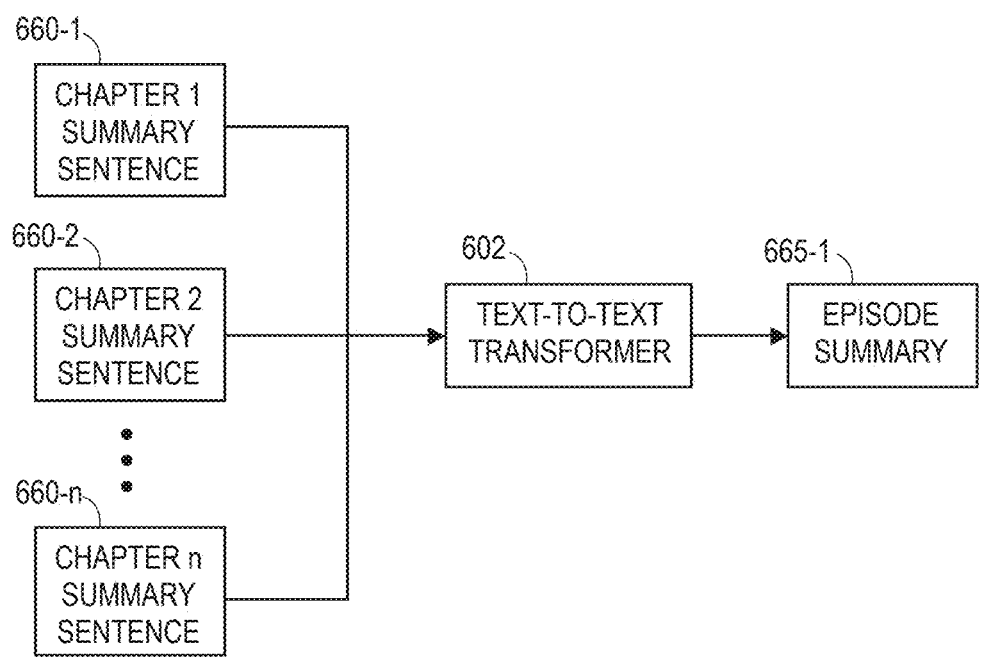
FIG. 6 is a view of aspects of one system for generating description pages in accordance with embodiments of the present disclosure.

Additionally, as is shown in FIG. 6, where summary sentences 660-1, 660-2 . . . 660-$n$ are identified for each of a plurality of n chapters, the summary sentences 660-1, 660-2 . . . 660-$n$ may be concatenated or otherwise combined to form a single set of text, which is provided to an abstractive transformer, e.g., a text-to-text transformer 602, that is trained to generate an episode summary 665-1 of the single set of text. The episode summary 665-1 may be shorter than the set of text from which the episode summary 665-1 was derived, but may have any length, e.g., three sentences, or any other length.

Figure 7:
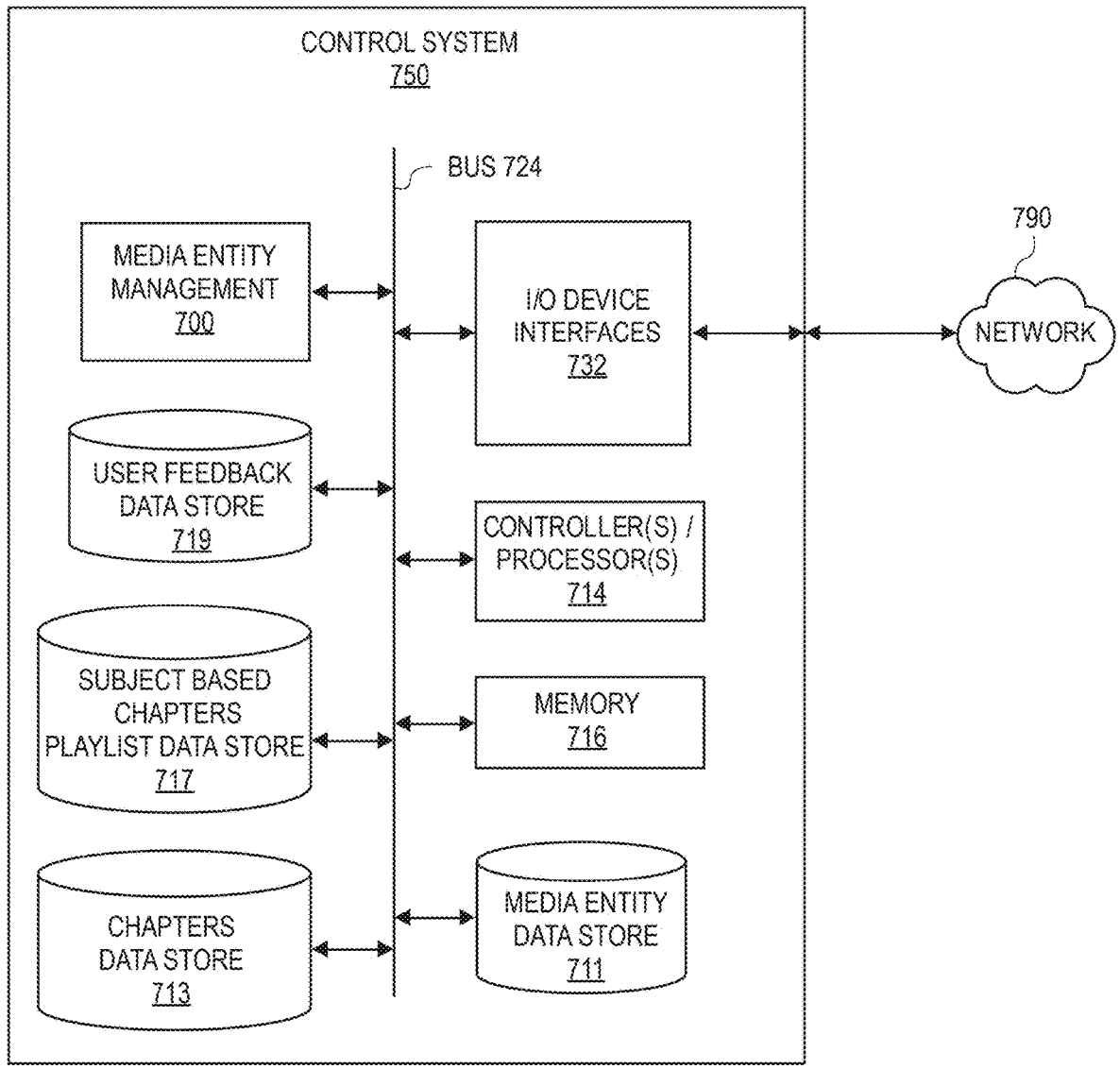
FIG. 7 is a view of aspects of one system for generating description pages in accordance with embodiments of the present disclosure.

Referring to FIG. 7, a view of aspects of one system for generating description pages in accordance with embodiments of the present disclosure is shown. As is shown in FIG. 7, a control system 750 may include or execute one or more of the applications or functions described herein. In some implementations, multiple control systems 750, each having one or more of the features described herein, may be utilized in concert with one another.

As is shown in FIG. 7, the control system 750 may include one or more processors 714, which may include a CPU for processing data and computer-readable instructions, and a memory 716 for storing data and instructions. The memory 716 may individually include volatile random-access memory ("RAM"), non-volatile read-only memory ("ROM"), non-volatile magnetoresistive random-access memory ("MRAM"), or any other types of memory.

The control system 750 may also include one or more data stores, such as a media entity data store 711, a chapters data store 713, a subject-based chapters playlist data store 717, a user feedback data store 719, or others. The data stores 711, 713, 717, 719 of the control system 750 may be configured to store data, computer-executable instructions, media entities, audio data, playlists, word tokens, segments, segment tokens, or any other information, data or metadata. The data stores 711, 713, 717, 719 may individually or collectively include one or more non-volatile storage types such as magnetic storage, optical storage, solid-state storage, or others. The control system 750 may also be connected to removable or external non-volatile memory or storage (e.g., a removable memory card, memory key drive, networked storage or others), or any other computer devices or systems (not shown) over one or more internal and/or external networks 790, through respective input/output ("I/O") device interfaces 732. One or more of the networks 790 may include the Internet in whole or in part.

In some implementations, instructions for operating the control system 750 and its various components may be executed by the controllers or processors 714, using the memory 716 as temporary "working" storage at runtime. The instructions may be stored in a non-transitory manner in non-volatile memory 716, in storage, or in any other devices. Alternatively, some or all of the instructions may be embedded in hardware, firmware or software.

The control system 750 includes input/output ("I/O") device interfaces 732, which enable the control system 750 to connect with a variety of components. Additionally, the control system 750 may include an address/data bus 724 for conveying data among components of the control system 750. Alternatively, components of the control system 750 may also connect directly to one another, in addition to (or instead of) being connected to the bus 724.

The control system 750 may also include a media entity management system 700, as well as data stores 711, 713, 717, 719, which may also be included in or accessible to the control system 750. The media entity data store 711 may store media entities that are available for listening by one or more listeners. The chapters data store 713 may maintain information, such as associations between segments of an audio data, chapter starts of different chapters, chapter subjects, chapter titles, or any other information. The subject-based chapters playlist data store 717 may maintain playlists corresponding to different subjects that are accessible and/or provided to different listeners such that the listeners can playback chapters from different audio data (e.g., media entities) that are related to a subject of the playlist. The user feedback data store 719 may maintain information from participants regarding chapters of different audio data (e.g., media entities), user feedback regarding the audio data as a whole, subject-based chapter playlists, or other user-provided information. The data stores 711, 713, 717, 719 may be any type of memory and may be local to the control system 750 or remote from the control system 750, system, in one or more alternate or virtual locations, e.g., in a "cloud"-based environment.

The components of the control system 750, as illustrated in FIG. 7, are exemplary, and may be located as a stand-alone device or may be included, in whole or in part, as a component of a larger device or system.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Likewise, although some of the embodiments described herein or shown in the accompanying figures refer to media entities such as podcasts that include audio data, the systems and methods disclosed herein are not so limited. The description pages described herein may be generated based on any type or form of media content, including not only audio but also video, which may be transmitted to and played on any number of devices of any type or form. Moreover, and as is noted above, in some implementations, a description page may be generated based on any set of text, and need not originate from a set of text transcribed from media content.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow chart shown in FIG. 3, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or more left-most digit(s) of a reference number identify a figure or figures in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A first computer system comprising at least one data store and at least one computer processor,
   wherein the first computer system is connected to one or more networks, and
   wherein the at least one data store has one or more sets of instructions stored thereon that, when executed by the at least one computer processor, cause the first computer system to perform a method comprising:
      generating a transcript of audio data representing at least a portion of a podcast, wherein the transcript comprises a set of words;
      dividing the transcript into a plurality of sections, wherein each one of the plurality of sections comprises a subset of the set of words of the transcript;
      generating, for each one of the sections, a sentence based at least in part on the subset of the set of words of the one of the sections;
      identifying, for each one of the sections, a phrase representative of the one of the sections, wherein each one of the phrases comprises at least some of the subset of the set of words of the one of the sections;
      generating a summary of the portion of the podcast based at least in part on the sentences generated for each one of the sections;
      identifying at least one phrase representative of the portion of the podcast based at least in part on the phrases representative of each one of the sections;
      generating a page of information regarding at least one of the podcast or the portion of the podcast, wherein the page comprises:
         a title of at least one of the at least one of the podcast or the portion of the podcast;
         the summary of the portion of the podcast; and
         the at least one phrase representative of the portion of the podcast; and
      transmitting data for causing a display of the page to a second computer system.

2. The first computer system of claim 1, wherein the method further comprises:
   receiving, from the second computer system, information regarding a selection of at least a portion of the page; and
   causing at least a portion of the audio data to be transmitted to the second computer system.

3. The first computer system of claim 1, wherein dividing the transcript into the plurality of sections comprises:
   identifying a plurality of segments of the audio data based at least in part on the set of words, wherein each one of the plurality of segments of the audio data includes one portion of the set of words;
   for each one of the plurality of segments:
      generating a plurality of word tokens, wherein each one of the plurality of word tokens generated for the one of the plurality of segments represents one word included in the one of the plurality of segments; and
      generating a segment token for the one of the plurality of segments based at least in part on the plurality of word tokens;
   generating, for each one of the segment tokens generated for one of the plurality of segments, a probability score, wherein each one of the probability scores represents a probability that the one of the plurality of segments is a start of a section; and
   identifying at least some of the plurality of sections based at least in part on the probability scores.

4. A method comprising:
   identifying a set of words associated with a media entity;
   determining that a first subset of the set of words represents a first section of the media entity;
   determining that a second subset of the set of words represents a second section of the media entity;
   selecting at least a first phrase from the first subset of the set of words;
   selecting at least a second phrase from the second subset of the set of words;
   generating at least one sentence based at least in part on a portion of the first subset of the set of words and a portion of the second subset of the set of words;
   generating at least one phrase based at least in part on the first phrase and the second phrase;
   generating a first page including information regarding the media entity, wherein the information regarding the media entity comprises:
      a title of the media entity;
      the at least one sentence; and
      the at least one phrase; and
   transmitting data for causing a display of at least the first page to a computer system.

5. The method of claim 4, further comprising:
   receiving, from the computer system, information regarding at least one interaction with at least a portion of the page; and
   in response to receiving the information regarding the at least one interaction,
      transmitting at least a portion of the audio data associated with the media entity to the computer system.

6. The method of claim 4, further comprising:
   identifying a plurality of segments of the media entity based at least in part on the set of words, wherein each one of the plurality of segments comprises a portion of the set of words;
   for each one of the plurality of segments:
      generating a plurality of word tokens, wherein each one of the plurality of word tokens generated for a segment represents one word included in the segment; and
      generating a segment token representing the one of the plurality of segments based at least in part on the plurality of word tokens;
   generating, for each segment token generated for one of the plurality of segments, a probability score, wherein each one of the probability scores is indicative of a likelihood that the one of the plurality of segments represented by the segment token is a start of a section of the media entity; and
   identifying at least the first section and the second section based at least in part on the probability scores.

7. The method of claim 6, further comprising:
   for each one of the plurality of segments:
      providing at least the plurality of word tokens generated for the segment to at least one transformer as inputs; and
      receiving outputs from the at least one transformer in response to the inputs,
   wherein each one of the probability scores is generated based at least in part on the outputs received from the at least one transformer.

8. The method of claim 4, wherein generating the at least one sentence comprises:
providing at least the portion of the first subset of the set of words and the portion of the second subset of the set of words to a summarizer model as inputs; and
receiving at least one output from the summarizer model in response to the inputs,
wherein the at least one sentence is generated based at least in part on the at least one output.

9. The method of claim 4, further comprising:
providing the first subset of the set of words to a summarizer model as first inputs;
receiving at least a first output from the summarizer model;
providing the second subset of the set of words to the summarizer model as second inputs; and
receiving at least a second output from the summarizer model,
wherein the at least one sentence is generated based at least in part on the first output and the second output.

10. The method of claim 9, further comprising:
determining a first word of the first subset of the set of words and a second word of the first subset of the set of words based at least in part on the first output; and
determining a first word of the second subset of the set of words and a second word of the second subset of the set of words based at least in part on the second output,
wherein the at least one sentence is generated based at least in part on the first word of the first subset of the set of words, the second word of the first subset of the set of words, the first word of the second subset of the set of words and the second word of the second subset of the set of words.

11. The method of claim 4, further comprising:
providing at least one of the first subset of the set of words or the second subset of the set of words to a detector model as an input; and
receiving at least an output from the detector model in response to the input; and
identifying a participant that uttered at least some of the set of words based at least in part on the output,
wherein the information regarding the media entity further comprises an identifier of the participant.

12. The method of claim 4, further comprising:
identifying a plurality of groups of words in the first subset of the set of words;
counting, for each one of the plurality of groups, a number of instances in which the one of the plurality of groups is included within the set of words; and
identifying a first group of the plurality of groups having a greatest number of instances of the plurality of groups,
wherein the first phrase comprises at least one word of the first group.

13. The method of claim 4, further comprising:
providing at least one of the first subset of the set of words or the second set of words to a transformer model as inputs, wherein the transformer model comprises a shared backbone, a summarization module, and a detector module;
identifying a first output from the summarization module, wherein the at least one sentence is generated based at least in part on the first output; and
identifying a second output from the detector module, wherein the at least one phrase is identified based at least in part on the second output.

14. The method of claim 4, wherein the information regarding the media entity further comprises:
a title associated with a series of media entities including the media entity;
an image associated with at least one of the series of media entities, the media entity or a participant in the media entity;
an interactive feature for requesting a download of at least the media entity;
an interactive feature for registering to receive the media entity or at least one of the series of media entities; and
an interactive feature for requesting information regarding at least one of the first section or the second section.

15. The method of claim 14, further comprising:
generating a second page including information regarding at least the first section and the second section, wherein the information regarding at least the first section and the second section comprises:
a descriptor of the first section;
an interactive feature for requesting at least the first section;
a duration of the first section;
a descriptor of the second section;
an interactive feature for requesting at least the second section; and
a duration of the second section; and
receiving, from the computer system, information regarding at least one interaction with the interactive feature for requesting information regarding at least one of the first section or the second section; and
in response to receiving the information regarding the at least one interaction,
transmitting data for causing a display of at least the second page to the computer system.

16. The method of claim 4, wherein the first page further comprises:
a descriptor of the first section;
an interactive feature for requesting a download of at least a portion of the media entity corresponding to the first section;
a descriptor of the second section; and
an interactive feature for requesting a download of at least a portion of the media entity corresponding to the second section.

17. The method of claim 4, wherein the media entity is an episode of a podcast.

18. A method comprising:
receiving a set of audio data from a computer device associated with a media entity;
transcribing the set of audio data into a set of words;
identifying a plurality of subsets of the set of words, wherein each of the plurality of subsets represents one of a plurality of sections of the media entity;
providing each of the plurality of subsets of the set of words as inputs to a transformer model;
generating a plurality of sentences, wherein each of the sentences is representative of one of the sections of the media entity, and wherein each of the sentences is generated based at least in part on a first output received from at least a portion of the transformer model in response to at least a first input of the inputs;
identifying a plurality of phrases, wherein each of the phrases comprises words of one of the plurality of subsets of the set of words, and wherein each of the phrases is generated based at least in part on a second output received from at least a portion of the transformer model in response to at least a second input of the inputs;

generating a sentence representative of the media entity based at least in part on at least one of the plurality of sentences;

selecting at least one of the plurality of phrases; and generating a page including information regarding the media entity, wherein the information regarding the media entity comprises:

a title associated with the media entity;

the sentence representative of the media entity; and the at least one of the plurality of phrases.

19. The method of claim 18, wherein the page further comprises an interactive feature configured to request audio data representing at least the media entity in response to an interaction, wherein the method further comprises:

transmitting data for causing a display of at least the page to a computer device associated with a listener;

receiving information regarding an interaction with the interactive feature from the computer device associated with the listener; and in response to receiving information regarding the interaction, transmitting at least a portion of the audio data representing at least the media entity to the computer device associated with the listener.

20. The method of claim 18, wherein generating the sentence representative of the episode of the media entity comprises:

providing at least the plurality of sentences to a summarizer model as inputs; and receiving at least one output from the summarizer model in response to the inputs, wherein the sentence representative of the media entity is generated based at least in part on the at least one output.

* * * * *